(12) United States Patent
Kudo

(10) Patent No.: US 8,314,842 B2
(45) Date of Patent: Nov. 20, 2012

(54) IMAGING APPARATUS AND METHOD FOR CONTROLLING THE SAME

(75) Inventor: Keisuke Kudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 460 days.

(21) Appl. No.: 12/562,900

(22) Filed: Sep. 18, 2009

(65) Prior Publication Data

US 2010/0073492 A1   Mar. 25, 2010

(30) Foreign Application Priority Data

Sep. 24, 2008 (JP) ................................ 2008-244942

(51) Int. Cl.
 *H04N 5/228* (2006.01)
 *G06K 9/40* (2006.01)
 *G06K 9/36* (2006.01)
 *G03B 17/00* (2006.01)

(52) U.S. Cl. ................ 348/208.4; 348/208.99; 382/275; 382/291; 396/52

(58) Field of Classification Search ............. 348/208.99, 348/208.12, 208.4, 246, 251; 396/52–55; 382/149, 275, 271, 151
See application file for complete search history.

(56) References Cited

U.S. PATENT DOCUMENTS

| 5,060,074 | A | * | 10/1991 | Kinugasa et al. | .......... 348/208.6 |
| 5,734,441 | A | | 3/1998 | Kondo | |
| 6,208,377 | B1 | | 3/2001 | Morofuji | |
| 6,233,009 | B1 | | 5/2001 | Morofuji | |
| 2004/0227837 | A1 | | 11/2004 | Ito | |
| 2007/0285522 | A1 | * | 12/2007 | Kimura | .................... 348/208.99 |
| 2008/0107307 | A1 | * | 5/2008 | Altherr | ......................... 382/107 |
| 2008/0158406 | A1 | | 7/2008 | Ito | |

FOREIGN PATENT DOCUMENTS

| JP | 5-007327 A | 11/1993 |
| JP | 6-098246 A | 4/1994 |
| JP | 6-105241 A | 4/1994 |
| JP | 2001-223894 A | 8/2001 |
| JP | 2004-242158 A | 8/2004 |

* cited by examiner

Primary Examiner — Aung S Moe
Assistant Examiner — Mekonnen Dagnew
(74) Attorney, Agent, or Firm — Canon USA, Inc., IP Division

(57) ABSTRACT

An imaging apparatus includes an image capturing unit including an image sensor capable of photoelectrically converting a subject image and configured to generate moving image data based on an output signal of the image sensor, a storage unit configured to store foreign substance information including information relating to at least a position and a size of a foreign substance adhered to an optical element disposed on a front side of the image sensor, a detection unit configured to detect a shake amount of the image sensor, a control unit configured to control an image clipping position on an entire screen of the image sensor according to the shake amount of the image sensor detected by the detection unit, and a recording unit configured to record the foreign substance information and information indicating the image clipping position in association with the moving image data.

7 Claims, 17 Drawing Sheets

| PARAMETER | SETTING DATA |
|---|---|
| APERTURE | F22 |
| ISO | 400 |
| SHUTTER SPEED | 1/30 |
| LIGHT METERING MODE | AVERAGE LIGHT MEASUREMENT |
| FLASH LIGHT EMISSION | PROHIBITED |
| EXPOSURE COMPENSATION | PROHIBITED |
| AF MODE | MANUAL |

FIG.5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST AREAS |
| +0C | | PARAMETERS OF DUST AREA $D_1$<br>  RADIUS (2 BYTES)<br>    X COORDINATE OF CENTER (2 BYTES)<br>    Y COORDINATE OF CENTER (2 BYTES) |
| | | PARAMETERS OF DUST AREA $D_2$ |
| | | . . . |
| | | PARAMETERS OF DUST AREA $D_n$ |

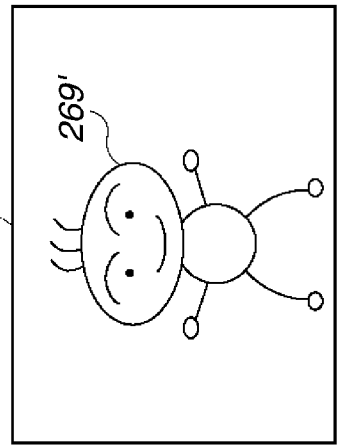
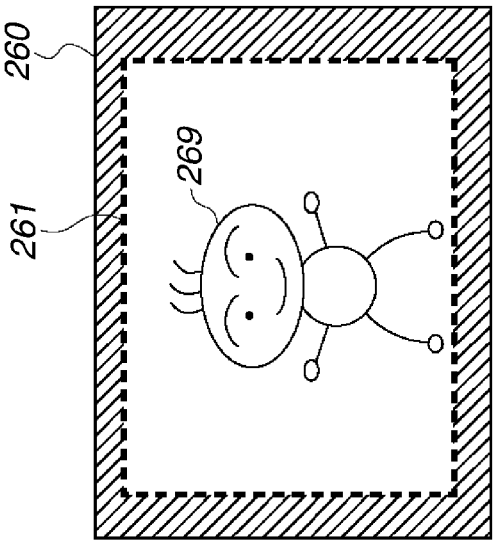
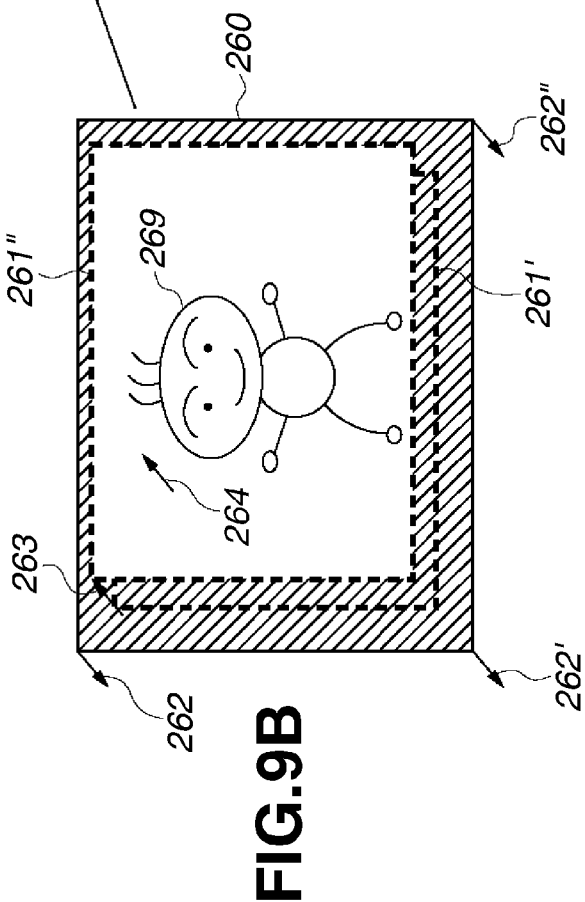

IMAGING APPARATUS AND METHOD FOR CONTROLLING THE SAME

BACKGROUND OF THE INVENTION

1. Field of the Invention

The present invention relates to an imaging apparatus using an image sensor such as a charge coupled device (CCD) sensor or a complementary metal oxide semiconductor (CMOS) sensor, and more specifically relates to a technique capable of suppressing image quality from being deteriorated by a foreign substance adhered to a surface of an optical low-pass filter disposed on the front side of the image sensor. In particular, the present invention relates to a technique capable of suppressing the image quality from being deteriorated by a foreign substance in a moving image capturing operation.

Further, the present invention relates to an imaging apparatus including an electronic image stabilization system that performs shake correction by electrically clipping a part of a captured image based on camera shake information.

2. Description of the Related Art

In a state where an interchangeable lens is removed from a camera body of a digital camera, a floating dust may enter an inside space of the camera body. Further, a shutter mechanism or other mechanically operable components are disposed in the camera body. Therefore, a slug may be generated in the camera body when these mechanism components operate.

If such a foreign substance (i.e., dust or slug) adheres to a surface of the optical low-pass filter disposed on the front side of the image sensor, which is an optical element configuring an imaging unit of the digital camera, a captured image may include a shade caused by the foreign substance. Namely, the quality of the captured image may be deteriorated.

When a camera is a type using a silver-halide film, the camera successively feeds the film by a predetermined amount every time when an image is captured. Therefore, it is quite rare that continuously captured images include the shade of the same foreign substance at the same position. On the other hand, the digital cameras are not configured to feed a film every time when an image is captured. Therefore, continuously captured images may include the shade of the same foreign substance at the same position.

To solve the above-described problem, there may be a method for correcting a defective pixel corresponding to a position of a foreign substance based on signals of surrounding pixels. For example, as a technique for correcting such a defective pixel, an image defect correction method discussed in Japanese Patent Application Laid-Open No. 6-105241 proposes a method to correct pixel defects of an image sensor.

Furthermore, as discussed in Japanese Patent Application Laid-Open No. 2004-242158, to simplify setting of pixel defect position information, an extension of an image file captured in a dust acquisition mode can be differentiated from that of a normally captured image. In this case, a personal computer (i.e., PC) automatically identifies a dust information image based on the extension and corrects an image to be corrected according to the obtained information.

Various techniques are conventionally available to correct a camera shake of a digital video camera. In general, the camera shake correction includes detecting camera shake information (e.g., shake amount or shake direction) of an imaging device (e.g., digital video camera) with an external sensor or through image processing, and moving a part of an optical system to cancel the camera shake, or partly clipping the image, based on the detection result.

As discussed in Japanese Patent Application Laid-Open No. 06-98246, as an external sensor, an angular speed sensor represented by a vibration gyroscope can be used to directly measure a camera shake amount of the imaging device. Further, as discussed in Japanese Patent Application Laid-Open No. 05-7327, image processing can be used to detect a motion vector of a screen based on a plurality of captured images and detect a camera-shake amount.

As a method for correcting a camera shake, a part of an imaging lens system is moved in a direction perpendicular to an optical axis to shift an image formed on an image sensor. As discussed in Japanese Patent Application Laid-Open No. 6-105241, a variable angle prism is disposed on the front side of the imaging lens system and an apical angle of the variable angle prism is moved to shift the image formed on the image sensor.

The above-described optical camera shake correction techniques are disadvantageous in cost because they require mechanical members, such as actuators and optical elements, although a dynamic range for the correction can be enlarged.

On the other hand, as discussed in Japanese Patent Application Laid-Open No. 05-7327, an image sensor having a larger size compared to an actually required image size is prepared for a moving image capturing operation and the camera shake can be corrected by clipping a part of an image obtained by the image sensor according to a detected camera shake amount (hereinafter, referred to as "electronic image stabilization"). The above-described camera shake correction based on image clipping does not require any mechanical members, and brings an effect of reducing the cost and is therefore widely used.

In the above-described situation, not only compact digital cameras but also lens-interchangeable digital cameras are recently required to record highly accurate moving images having higher resolutions.

However, as described above, the lens-interchangeable digital camera is subjected to an influence of dusts or slugs adhered to the surface of its image sensor due to various factors. Therefore, if a moving image recording is performed with the lens-interchangeable digital camera, a foreign substance may be constantly displayed during a playback (i.e., reproduction) operation of the captured moving image.

According to a conventional dust removal method for the lens-interchangeable digital camera, dust removal relevant information (e.g., dust position and size information) and image data are recorded beforehand. Subsequently, a personal computer performs image processing on captured images to remove the influence of the dust. In this case, the recorded image data contain dust components.

An electronic image stabilization system can be used to correct an image shake generated by the camera shake when a moving image capturing operation is performed. However, when the electronic image stabilization system performs correction, a relative relationship between the dust removal relevant information and an actual position of a dust on a captured image may change because an image clipping position is variable depending on each frame. Therefore, the electronic image stabilization system cannot accurately perform dust correction processing.

SUMMARY OF THE INVENTION

According to an aspect of the present invention, an imaging apparatus includes an image capturing unit having an image sensor capable of photoelectrically converting a subject image and configured to generate moving image data based on an output signal of the image sensor; an acquisition unit configured to acquire foreign substance information including information relating to at least a position and a size of a foreign substance adhered to an optical element disposed on a front side of the image sensor; a detection unit configured to detect a shake amount of the image sensor; a control unit configured to control an image clipping position on an entire screen of the image sensor according to the shake amount of the image sensor detected by the detection unit; and a recording unit configured to record information indicating the image clipping position in association with the moving image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a structure of a dust information profile.

FIGS. 9A, 9B, and 9C illustrate an example of processing performed by a shake correction unit.

DESCRIPTION OF THE EMBODIMENTS

Various exemplary embodiments, features, and aspects of the present invention will now be herein described in detail below with reference to the drawings. The relative arrangement of the components, the numerical expressions, and numerical values set forth in these embodiments are not intended to limit the scope of the present invention.

Figure 1:
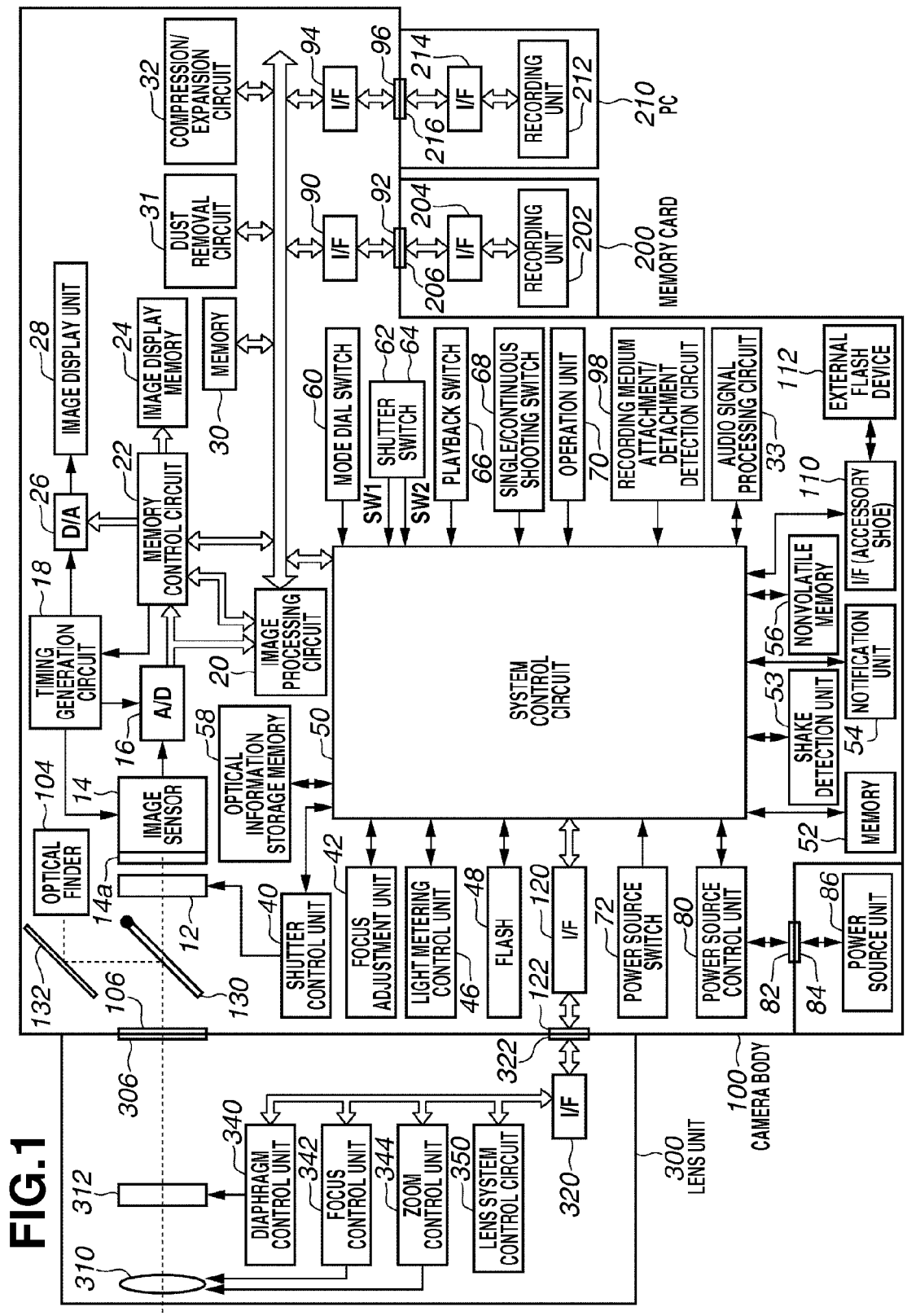
FIG. 1 is a block diagram illustrating an example of a configuration of an imaging apparatus having an image processing function according to a first exemplary embodiment of the present invention.

FIG. 1 is a block diagram illustrating an example configuration of an imaging apparatus having an image processing function according to a first exemplary embodiment of the present invention.

In the present exemplary embodiment, the imaging apparatus is a single-lens reflex type digital still camera that uses an interchangeable lens. The present exemplary embodiment can be also applied to a digital video camera using an interchangeable lens that can serve as an imaging apparatus.

As illustrated in FIG. 1, the imaging apparatus according to the present exemplary embodiment includes a camera body 100 and an interchangeable-lens type lens unit 300.

The lens unit 300 includes an imaging lens 310 including two or more lenses, a diaphragm 312, and a lens mount 306 that mechanically connects the lens unit 300 to the camera body 100. The lens mount 306 has various functions for electrically connecting the lens unit 300 to the camera body 100.

An interface 320, which is disposed on the lens mount 306, allows the lens unit 300 and the camera body 100 to perform data communications. A connector 322 can electrically connect the lens unit 300 to the camera body 100.

The connector 322 allows the camera body 100 and the lens unit 300 to transmit control signals, state signals, and data signals. The connector 322 can further function as a device for supplying electric power from the camera body 100 to the lens unit 300. The connector 322 is not limited to electric communications and may be configured to perform optical communications and audio communications.

A diaphragm control unit 340 can control the diaphragm 312 in association with a shutter control unit 40 that controls a shutter 12 of the camera body 100, based on light metering information from a light metering control unit 46. A focus control unit 342 can control focusing of the imaging lens 310. A zoom control unit 344 can control zooming of the imaging lens 310.

A lens system control circuit 350 can control various operations that are performed by the lens unit 300. The lens system control circuit 350 includes a memory that stores operation constants, variables, and programs. The lens system control circuit 350 further includes a nonvolatile memory that stores identification information (e.g., a number unique to the lens unit 300), administration information, function information (e.g., opened aperture value, minimum aperture value, and focal length), as well as present and past setting values.

An example of a configuration of the camera body 100 is described below.

A lens mount 106 can mechanically connect the camera body 100 to the lens unit 300. A pair of mirrors 130 and 132, which is a single-lens reflex type, can guide light incident on the imaging lens 310 to an optical finder 104. The mirror 130 may be a quick return mirror or a half mirror.

The shutter 12 is a focal plane type shutter. The image sensor 14 is, for example, a CCD or CMOS sensor, which can photoelectrically convert a subject image. An optical element 14a, such as an optical low-pass filter, is disposed on the front side of the image sensor 14. If a foreign substance, such as a dust, adheres to a surface of the optical element 14a, an image captured by the image sensor 14 may include the foreign substance. In other words, the foreign substance on the optical element 14a deteriorates image quality. The present exemplary embodiment is directed to a technique capable of suppressing the image quality from being deteriorated.

The light incident on the imaging lens 310 is guided via the diaphragm 312 (i.e., a light quantity limiting element), the lens mounts 306 and 106, the mirror 130, and the shutter 12, which serve as a single-lens reflex type optical system, to the image sensor 14 on which an optical image is formed.

An analog-digital (A/D) converter 16 can convert an analog signal output from the image sensor 14 into a digital signal. A timing generation circuit 18 can supply clock signals and control signals to the image sensor 14, the A/D converter 16, and a digital-analog (D/A) converter 26. A memory control circuit 22 and a system control circuit 50 can control the timing generation circuit 18.

An image processing circuit 20 performs predetermined pixel interpolation processing and color conversion processing on the data output from the A/D converter 16 or data from the memory control circuit 22. The image processing circuit 20 further performs predetermined calculation processing on image data output from the A/D converter 16, if useful.

The system control circuit 50 can perform through-the-lens (TTL) type automatic focus (AF) processing, automatic exposure (AE) processing, and flash pre-flash (EF) processing based on obtained calculation results, to control the shutter control unit 40 and the focus adjustment unit 42.

The image processing circuit 20 further performs predetermined calculation processing using the image data output from the A/D converter 16 and performs TTL automatic white balance (i.e., AWB) processing based on obtained calculation results.

The imaging apparatus according to the present exemplary embodiment illustrated in FIG. 1 includes the focus adjustment unit 42 and the light metering control unit 46, which perform the AF processing, the AE processing, and the EF processing. In this case, the image processing circuit 20 is not used for the AF processing, the AE processing, and the EF processing.

Alternatively, when the focus adjustment unit 42 and the light metering control unit 46 are used to perform the AF processing, the AE processing, and the EF processing, the image processing circuit 20 may also be operated to perform the AF processing, the AE processing, and the EF processing.

The memory control circuit 22 can control the A/D converter 16, the timing generation circuit 18, the image processing circuit 20, an image display memory 24, the D/A converter 26, a memory 30, and a compression/expansion circuit 32.

The image data output from the A/D converter 16 is written into the image display memory 24 or the memory 30 via the image processing circuit 20 and the memory control circuit 22 or via the memory control circuit 22 only.

An image display unit 28 includes a TFT liquid crystal display (LCD). Image data to be displayed, which is written in the image display memory 24, is displayed on the image display unit 28 via the D/A converter 26. An electronic viewfinder (EVF) function can be realized by successively displaying captured image data on the image display unit 28.

The image display unit 28 can turn on and off its display in response to an instruction from the system control circuit 50.

When the display of the image display unit 28 is turned off, electric power consumption in the camera body 100 can be greatly reduced.

The memory 30 can store captured still images and moving images. The memory 30 has a storage capacity sufficient for storing a predetermined number of still images or predetermined amount of moving images. Therefore, even in a continuous shooting operation or in a panorama shooting operation, in which a plurality of still images are continuously captured, the digital camera can speedily write a great amount of images into the memory 30.

Further, in a moving image capturing operation, the memory 30 can be used as a frame buffer for images continuously written at a predetermined rate. Furthermore, the memory 30 can be used as a work area for the system control circuit 50.

A dust removal circuit 31 can perform image processing for removing dust from the image data referring to dust information stored in a nonvolatile memory 56 and optical information obtained from the lens unit 300.

A compression/expansion circuit 32 can compress and expand the image data according to a conventional method. More specifically, the compression/expansion circuit 32 reads an image from the memory 30, performs compression or expansion processing on the read image, and writes the processed data into the memory 30.

Further, the compression/expansion circuit 32 has a function of compressing and encoding moving image data into a predetermined format, or expanding a moving image signal from predetermined encoded compression data.

An audio signal processing circuit 33 can encode an audio signal input from a microphone (not illustrated) into a predetermined encoded format, or can decode an audio signal from a predetermined encoded data.

The digital camera according to the present exemplary embodiment has a function of outputting audio data decoded by the audio signal processing circuit 33 via a speaker (not illustrated).

The shutter control unit 40 can control the shutter 12 in association with the diaphragm control unit 340 that controls the diaphragm 312 based on the light metering information from the light metering control unit 46.

The focus adjustment unit 42 can perform the automatic focus (AF) processing. The focus adjustment unit 42 measures a focus state of an optical image that is formed when the light incident on the imaging lens 310 in the lens unit 300 travels via the diaphragm 312, the lens mounts 306 and 106, the mirror 130, and a focus adjustment sub mirror (not illustrated) according to the single-lens reflex mechanism.

The light metering control unit 46 can perform the automatic exposure (AE) processing. The light metering control unit 46 measures an exposure state of an optical image that is formed when the light incident on the imaging lens 310 in the lens unit 300 travels via the diaphragm 312, the lens mounts 306 and 106, the mirror 130, and a light metering sub mirror (not illustrated) according to the single-lens reflex mechanism.

A flash 48 has an AF auxiliary light emission function and a flash light adjustment function. The light metering control unit 46 and the flash 48 can cooperatively perform flash light adjustment (EF) processing.

The digital camera can perform AF control based on measurement results obtained by the focus adjustment unit 42 and calculation results obtained by the image processing circuit 20 that processes the image data output from the A/D converter 16.

The digital camera can further perform exposure control based on measurement results obtained by the light metering control unit 46 and the calculation results obtained by the image processing circuit 20 that processes the image data output from the A/D converter 16.

The system control circuit 50, including a conventionally known central processing unit (CPU), can control various operations to be performed by the camera body 100. A memory 52 stores operation constants, variables, and programs to be used in the system control circuit 50.

A shake detection unit 53 can detect a camera shake of the camera body 100. For example, the shake detection unit 53 includes an angular speed sensor (e.g., a vibration gyroscope).

A notification unit 54 can notify an operation state and a message, using text, image, and audio, according to execution of a program in the system control circuit 50. The notification unit 54 is, for example, a display device (e.g., LCD or light-emitting diode (LED)) configured to perform a visual display or an audio device that can generate sounds. The notification unit 54 can be configured as at least one of them or a combination of the above-described devices.

The notification unit 54 may include one or more easily visible display devices disposed in the vicinity of an operation unit 70 of the camera body 100. The notification unit 54 may be partly incorporated in the optical finder 104.

The notification unit 54 can display the following contents on the image display unit 28 (e.g., LCD).

The contents displayed on the image display unit 28 via the notification unit 54 include shooting-mode related display, such as single shooting/continuous shooting operation display, self timer display, etc., recording related display, such as compression rate display, recording pixel number display, number of recorded images display, number of recordable images display, etc., and shooting condition-related display, such as shutter speed display, aperture value display, exposure compensation display, light adjustment correction display, external flash light emission amount display, red-eye reduction display, etc.

Further, the contents displayed on the image display unit 28 include miscellaneous display, such as macro shooting display, buzzer setting display, battery remaining capacity display, error display, plural digit information display, attachment/detachment state display for a recording medium 200 and a personal computer (PC) 210, attachment/detachment state display for the lens unit 300, communication I/F operation display, date/time display, connection state display for an external computer.

The display contents displayed on the optical finder 104 via the notification unit 54 include, for example, in-focus display, shooting preparation completion display, camera shake warning display, flash unit charge display, flash charge completion display, shutter speed display, aperture value display, exposure compensation display, and recording medium writing operation display.

A nonvolatile memory 56 is an electrically erasable/recording memory (e.g., Electrically Erasable Programmable Read Only Memory (EEPROM)) that stores programs. An optical information storage memory 58 stores various lens information obtained from the lens unit 300 via the connector 122.

A mode dial switch 60, a shutter switch SW1 62, a shutter switch SW2 64, a playback switch 66, a single/continuous shooting switch 68, and the operation unit 70 enables users to input various operation instructions to the system control circuit 50. The operation input units for the system control circuit 50 can be configured as switches, dials, a touch panel, a line-of-sight detection pointing device, and an audio recognition device, which may be used as an independent component or a combination of a plurality of components.

Respective operation input units are described below in more detail.

The mode dial switch 60 can be operated to set a function shooting mode, such as an automatic shooting mode, a programmed shooting mode, a shutter speed priority shooting mode, an aperture priority shooting mode, a manual shooting mode, or a depth-of-focus priority shooting mode.

The mode dial switch 60 can be further used to set another function shooting mode, such as a portrait shooting mode, a landscape shooting mode, a close-up shooting mode, a sports shooting mode, a night view shooting mode, or a panoramic shooting mode.

If a shutter button (not illustrated) is pressed by a predetermined amount (e.g., half-pressed), the shutter switch SW1 62 is turned on. The shutter switch SW1 can be operated to instruct starting an operation relating to the AF processing, the AE processing, the AWB processing, or the EF processing.

If the shutter button (not illustrated) is fully pressed by a full stroke, the shutter switch SW2 64 is turned on. The shutter switch SW2 64 can be operated to instruct starting sequential processing including exposure processing, development processing, and recording processing.

First, in the exposure processing, the digital camera writes a signal read by the image sensor 14 into the memory 30 via the A/D converter 16 and the memory control circuit 22. Then, the digital camera performs development processing using calculation results obtained by the image processing circuit 20 and the memory control circuit 22.

Further, in the recording processing, the compression/expansion circuit 32 performs compression on image data read from the memory 30 and the compressed data is written in the recording medium 200 or transmitted to the PC 210.

The playback switch 66 can be operated to instruct starting a playback operation for reading images from the memory 30, the recording medium 200, or the PC 210, which stores the images captured in a shooting mode state, and displaying the read images on the image display unit 28. The playback switch 66 can be further used to set a function mode, such as a playback mode, a multi-screen reproduction/deletion mode, or a PC connection mode.

The single/continuous shooting switch 68 can be operated to select a single shooting mode for capturing a one-frame image when the shutter switch SW2 (64) is pressed and keeping a standby state for the next shooting operation, or a continuous shooting mode for continuously performing image capturing operations when the shutter switch SW2 (64) is pressed and held.

The operation unit 70 includes various buttons and a touch panel. For example, the operation unit 70 includes a live view start/stop button, a moving image recording start/stop button, a menu button, a set button, a multi-screen reproduction page-break button, a flash setting button, a single shooting/continuous shooting/self timer switching button, a menu shift+(plus) button, and a menu shift−(minus) button.

The operation unit 70 further includes a playback image shift+(plus) button, a playback image shift−(minus) button, a captured image quality selection button, an exposure compensation button, a light adjustment correction button, an external flash light emission amount setting button, and a date/time setting button.

If a rotary dial switch is provided for each function of the above-described plus button and the minus button, numerical values and functions can be easily selected.

The operation unit 70 further includes an image display ON/OFF switch that can be operated to set ON/OFF of the image display unit 28, and a quick view ON/OFF switch that can be operated to set a quick view function for automatically reproducing captured image data immediately after the capturing operation is completed. The operation unit 70 further includes a compression mode switch that can be operated to set a compression rate in a JPEG compression or select a RAW mode for directly recording a signal of the image sensor as a digital signal into a recording medium.

The operation unit 70 further includes an AF mode setting switch that can be operated to set a one-shot AF mode or a servo AF mode. In the one-shot AF mode, the digital camera starts an automatic focusing operation in response to a turned-on of the shutter switch SW1 62, and if it attains an in-focus state, maintains the in-focus state. In the servo AF mode, the digital camera continuously performs the automatic focusing operation when the shutter switch SW1 62 is pressed.

Furthermore, the operation unit 70 includes a setting switch that can be operated to set a dust information acquisition mode for acquiring dust information from a captured dust detection image.

A power source switch 72 can be operated to switch a mode setting between on and off for the power source of the camera body 100. The power source switch 72 can be further operated to switch a mode setting between on and off for power sources of various devices (e.g., the lens unit 300, an external flash device 112, the recording medium 200, and the PC 210) connected to the camera body 100.

A power source control unit 80 includes a battery detection circuit, a direct-current to direct-current (DC-DC) converter, a power supply block switch circuit. The power source control unit 80 detects a battery attached to the camera body, a type of the battery, and a remaining capacity of the battery. The power source control unit 80 controls the DC-DC converter based on detection results and an instruction from the system control circuit 50 so that electric power of a required voltage and a required time period can be supplied to various portions including a recording medium.

A power source unit 86, which includes a primary battery (e.g., alkali battery or a lithium battery), a secondary battery (e.g., a NiCd battery, a NiMH battery, a Li-ion battery, or a Li polymer battery), and an AC adapter, is connected to the camera body 100 via a pair of connectors 82 and 84.

An interface 90 is connectable via a connector 92 to the recording medium 200 (e.g., a memory card or a hard disk). An interface 94 is connectable via a connector 96 to the PC 210. A recording medium attachment/detachment detection circuit 98 can detect whether the recording medium 200 or the PC 210 is attached to the connector 92 and/or 96.

In the present exemplary embodiment, two sets of the interface and the connector are provided for attaching recording media. However, the total number of the interfaces and the connectors can be appropriately changed. The interfaces and the connectors can be arbitrarily combined with any other type of interfaces and connectors.

The interfaces and the connectors can be configured to conform to standards of various storage media. For example, a Personal Computer Memory Card International Association (PCMCIA) card or a compact flash (CF®) card, or a SD card can be used. If the interfaces 90 and 94 and the connectors 92 and 96 are configured to conform to the standards of the PCMCIA card or the CF card, various communication cards can be connected to the digital camera.

The communication cards connectable to the camera body 100 include a local area network (LAN) card, a modem card, a Universal Serial Bus (USB) card, an Institute of Electrical and Electronic Engineers (IEEE) 1394 card, a P1284 card, a Small Computer System Interface (SCSI) card, and a PHS. The digital camera can transfer image data and relevant administration information, via any one of the above-described communication cards, to peripheral devices including other computers and printers.

The optical finder 104 can receive light incident on the imaging lens 310 guided by the single-lens reflex mechanism (i.e., the diaphragm 312, the lens mounts 306 and 106, and the mirrors 130 and 132). An optical image can be displayed on the optical finder 104. Thus, the digital camera enables users to perform a shooting operation using only the optical finder without using an electronic finder function realized by the image display unit 28.

At least part of the functions of the notification unit 54, such as displays relating to in-focus status, camera shake warning, flash charging, shutter speed, aperture value, and exposure compensation, can be realized by the optical finder 104.

The external flash device 112 is attached to the camera body 100 via an accessory shoe 110.

An interface 120 connects the camera body 100 to the lens unit 300 in the lens mount 106.

The connector 122 electrically connects the camera body 100 to the lens unit 300. A lens attachment/detachment detection unit (not illustrated) can detect whether the lens unit 300 is mounted on the lens mount 106 and the connector 122.

Control signals, state signals, and data signals can be transmitted via the connector 122 between the camera body 100 and the lens unit 300. Electric power can be also supplied from the camera body 100 to the lens unit 300 via the connector 122.

Optical information (e.g., aperture, zoom position, pupil position, and focal length) of the lens unit 300 transmitted via the connector 122 can be stored in the optical information storage memory 58 of the camera body 100. Each of the camera body side and the lens unit side can request starting communication in response to a renewal of the information.

The connector 122 can be configured to perform optical communications and audio communications.

The recording medium 200 is, for example, a memory card or a hard disk. The recording medium 200 includes a recording unit 202 configured by a semiconductor memory or a magnetic disk, an interface 204 for communication with the camera body 100, and a connector 206 for connection with the camera body 100.

The recording medium 200 may be configured by the PCMCIA card, the compact Flash®, a micro digital audio tape (DAT), a magneto-optical disk, a compact disc recordable (CD-R), a compact disc-rewritable (CD-RW), or other comparable optical disk, a digital versatile disc (DVD), or other comparable phase change optical disc.

The PC 210 includes a recording unit 212 configured by a magnetic disk (HD), an interface 214 for communication with the camera body 100, and a connector 216 for connection with the camera body 100. The interface 94 may be a USB type or an IEEE1394 type, although not limited to a specific type.

The imaging apparatus having the above-described configuration can perform the following image processing for removing an influence of a dust adhered to an optical element (e.g., a low-pass filter or a cover glass) disposed on the front side of the image sensor.

In the present exemplary embodiment, the imaging apparatus captures a dust detection image to be used to obtain dust information (i.e., foreign substance information), which indicates a position and the size of a dust (i.e., a foreign substance). Then, the imaging apparatus extracts and generates dust data.

It is desired that the dust detection image is an image of an object having a uniform luminance surface. However, the uniformity is not so strictly required because it is desired that the dust detection image can be easily obtained. For example, the dust detection image is a blue sky or a white wall surface.

Figure 2:
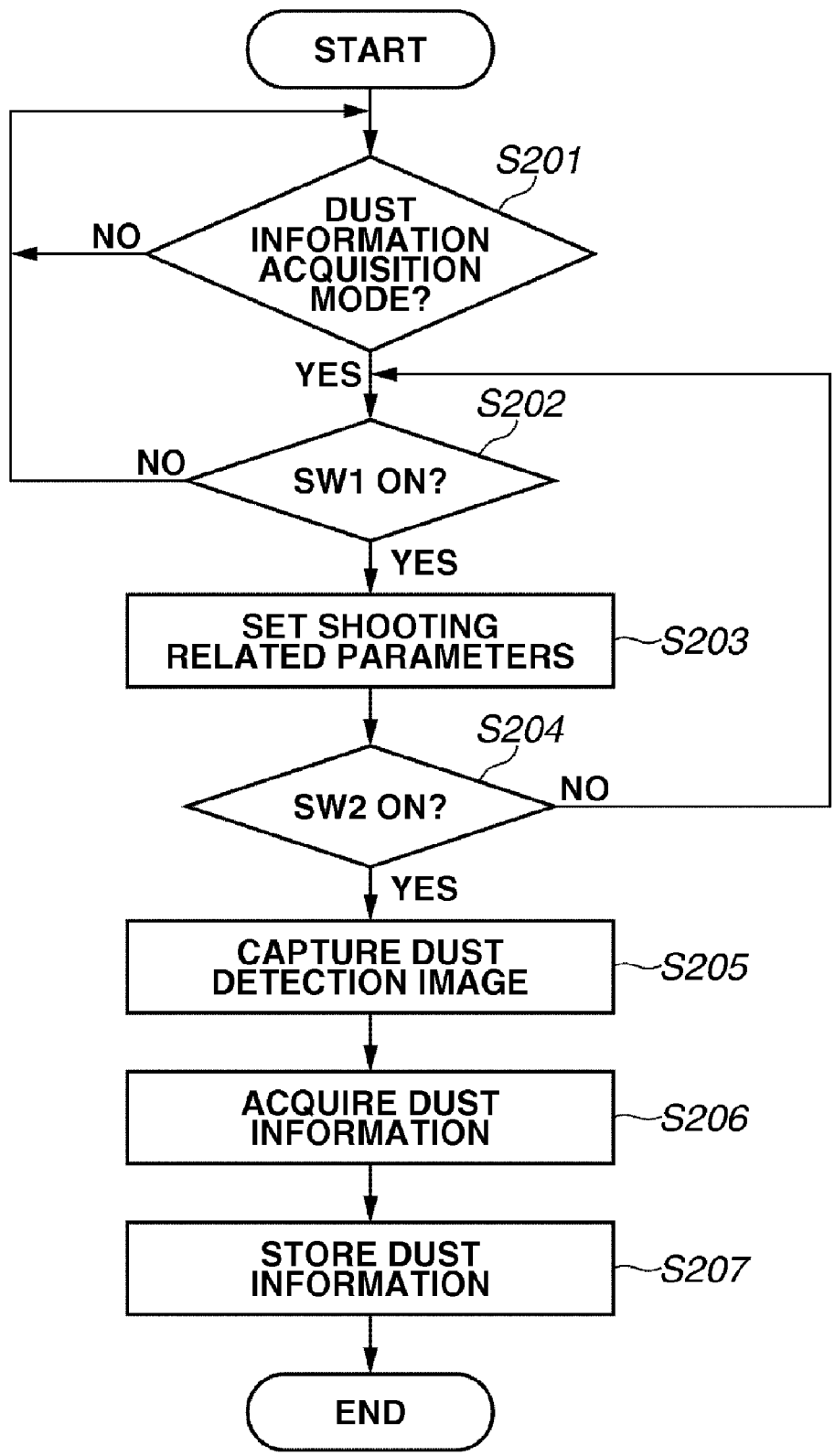
FIG. 2 is a flowchart illustrating an example of processing performed by the imaging apparatus (e.g., a digital camera according to the present exemplary embodiment) to acquire dust information.

FIG. 2 is a flowchart illustrating an example of processing that is performed by the imaging apparatus (e.g., the digital camera according to the present exemplary embodiment) to acquire the dust information in the present exemplary embodiment.

First, in step S201, the imaging apparatus determines whether the dust information acquisition mode is selected by the operation unit 70. If the determination in step S201 is NO, the imaging apparatus repeats the processing in step S201 until the dust information acquisition mode is selected. If it is determined that the dust information acquisition mode is selected (YES in step S201), then in step S202, the imaging apparatus determines whether the shutter switch SW1 62 is turned on. If it is determined that the shutter switch SW1 62 is in an OFF state (NO in step S202), the processing returns to step S201 to repeat the above-described processing.

Figures 3, 4:
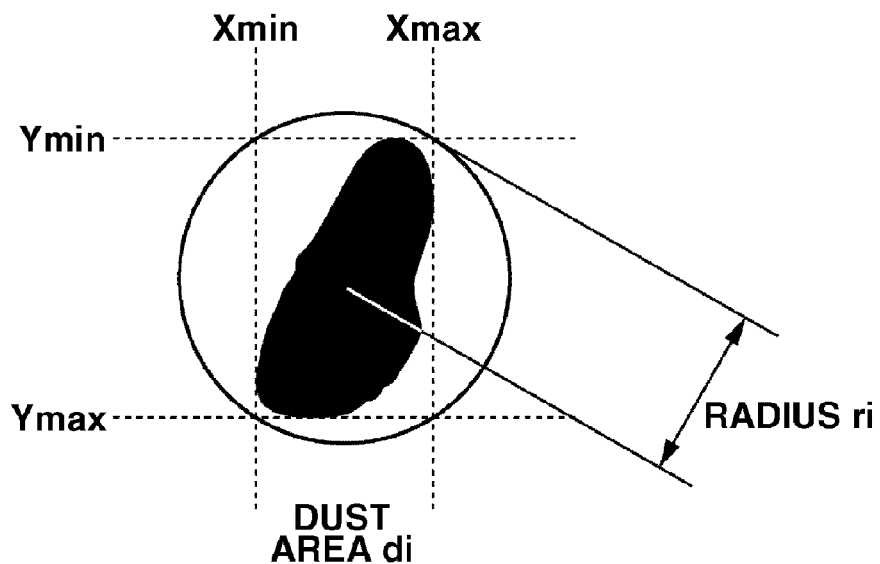
FIG. 3 illustrates a list of setting parameters to be used in acquisition of the dust information.
FIG. 4 illustrates an example of dust area size calculation.

On the other hand, if it is determined that the shutter switch SW1 62 is in an ON state (YES in step S202), then in step S203, the imaging apparatus sets an aperture value, an ISO value, a shutter speed, and other shooting-related parameters. FIG. 3 illustrates examples of the setting parameters.

The aperture value is set to F22 according to which an aperture of the diaphragm is decreased. For example, it is useful to set a stopped-down aperture value in a range settable by the lens unit 300 connected to the lens mount 106.

In general, the dust adheres to a protection glass of the image sensor 14 (not a surface of the image sensor 14 itself) or an optical filter (i.e., the optical element 14a) disposed on the subject side of the image sensor. Accordingly, an image formation state is variable depending on the aperture value of the lens unit 300.

If the diaphragm is in or close to an opened state, an image of the dust may be defocused. An appropriate dust detection image cannot be acquired. It is therefore desired to set a stopped-down aperture value.

Referring back to the flowchart illustrated in FIG. 2, a photographer directs the imaging apparatus toward a white wall or another uniform luminance surface and presses the shutter switch SW2 64.

In step S204, the imaging apparatus determines whether the shutter switch SW2 64 is turned on. If it is determined that the shutter switch SW2 64 is in an OFF state (NO in step S204), the processing returns to step S202 to perform the above-described determination related to the shutter switch SW1 62. If it is determined that the shutter switch SW2 64 is in an ON state (YES in step S204), the processing proceeds to step S205.

In step S205, the imaging apparatus captures the dust detection image (e.g., the uniform luminance surface) and stores captured image data in the memory 30. Next, in step S206, the imaging apparatus acquires the dust information from the image data stored in the memory 30.

The imaging apparatus performs the following processing for acquiring the dust information. More specifically, the imaging apparatus obtains position (i.e., coordinates) and size information of a dust area from the captured dust detection image.

First, the imaging apparatus divides the area of the captured dust detection image into a plurality of blocks, calculates a maximum luminance Lmax and an average luminance Lave in each block, and calculates a threshold value T1 in the block according to the following formula.

$$T1 = Lave \times 0.6 + Lmax \times 0.4$$

Next, the imaging apparatus specifies a pixel not exceeding the threshold value T1 as a dust pixel because a pixel, to which a dust is attached, has a luminance value lower than those of surrounding pixels. Then, the imaging apparatus identifies an independent area configured by the dust pixel(s) as a dust area di (i=0, 1, ..., n).

FIG. 4 illustrates an example of dust area size calculation. As illustrated in FIG. 4, the imaging apparatus obtains a maximum value Xmax and a minimum value Xmin in the horizontal direction as well as a maximum value Ymax and a minimum value Ymin in the vertical direction, with respect to the coordinate values of the pixel configuring each dust area, and calculates a radius ri representing the size of the dust area di according to the following formula.

$$ri = [\sqrt{\{(Xmax - Xmin)^2 + (Ymax - Ymin)^2\}}]/2$$

In this case, center coordinate values (Xdi, Ydi) can be approximately defined by the following formulae.

$$Xdi = (Xmax + Xmin)/2$$

$$Ydi = (Ymax + Ymin)/2$$

The imaging apparatus records the obtained position (i.e., coordinate values) and the radius as a dust information profile.

Due to the restriction in the size of the nonvolatile memory 56, dust correction data (i.e., dust information profile) may be limited in its data size. In such a case, the imaging apparatus sorts dust position information according to the size or an average luminance value of the dust area.

In the present exemplary embodiment, the imaging apparatus sorts the dust position information in descending order of the magnitude of the radius ri. If two or more pieces of the dust position information cannot be discriminated in the magnitude of the radius ri, then the imaging apparatus sorts them according to ascending order of the magnitude of the average luminance value. Through the above-described processing, the imaging apparatus can prioritize an outstanding dust over others in registration of the dust correction data. In the present exemplary embodiment, Di represents a sorted dust area and Ri represents a radius of the dust area Di.

If a target dust area has a size greater than a predetermined size, the target dust area can be removed from the candidates to be sorted and can be relocated on the tail of a sorted dust area list. If a large dust area is subjected to interpolation processing, the image quality may deteriorate. Therefore, it is desired to rank the large dust area lowest in the priority order of the correction target.

FIG. 5 illustrates an example of a structure of the dust information profile. As illustrated in FIG. 5, the dust information profile stores lens information and dust position/size information in a dust detection image capturing operation. More specifically, as the lens information in the dust detection image capturing operation, the dust information profile stores an actual aperture value (i.e., F-number) and a corresponding lens pupil position in the dust detection image capturing operation.

Subsequently, the imaging apparatus stores a number of detected dust areas (i.e., an integer value) in a storage area and then repetitively stores parameters representing respective dust areas. The parameters representing each dust area can be a set of three numerical values, e.g., radius of dust (e.g., 2 bytes), X coordinate (e.g., 2 bytes) and Y coordinate (e.g., 2 bytes) of the center of an effective image area.

In step S207, the imaging apparatus stores the acquired dust information in the nonvolatile memory 56. Then, the imaging apparatus terminates the dust information acquisition processing.

A shooting operation in the dust information acquisition mode is intended to acquire the dust information. Therefore, in the present exemplary embodiment, the imaging apparatus does not compress a captured image and does not record the image into the recording medium 200.

The above-described processing is effective to prevent the capacity of the recording medium 200 from being uselessly used for the image data unnecessary for the photographer. However, similar to an ordinary image, the image can be compressed and then stored in the recording medium 200. Further, in this case, an extension may be changed.

The present exemplary embodiment relates to a correction method to be performed when a moving image is captured, including image processing that can correct the image quality deteriorated by a dust. Prior to a detailed description of the moving image processing, an example of still image processing is described below.

In a case where an ordinary shooting operation (which is different from the dust detection image capturing operation) is performed, if the image to be processed is a still image, the imaging apparatus records the dust correction data (i.e., the dust information profile) illustrated in FIG. 5 in association with image data, in addition to camera setting values in the ordinary shooting operation, in the recording medium 200.

More specifically, to realize the associated recording, the imaging apparatus can additionally write the dust correction data, for example, in an Exchangeable image file format (Exif) area (i.e., a header area) of an image file in which the camera setting values in the shooting operation are recorded.

Alternatively, to realize the associated recording, the imaging apparatus can record the dust correction data independent of the file and record only link information of the dust correction data file in the image data.

However, if the image file and a dust correction data file are separately recorded, the link relationship may be lost when the image file is transferred. Therefore, it is desired to store the dust correction data integrated with the image data.

Recording the dust correction data in association with the image data is useful when the image data including the additionally recorded dust correction data is transferred to an external image processing apparatus, to enable the external image processing apparatus to perform the dust removal processing.

Next, an example of the dust removal processing in the ordinary shooting operation, using the dust information stored in the nonvolatile memory 56 as described above, is described below with reference to flowcharts illustrated in FIGS. 6 and 7.

Although the following description relates to an example of the dust removal processing for a still image, similar dust removal processing can be executed for each frame of a moving image.

Figure 6:
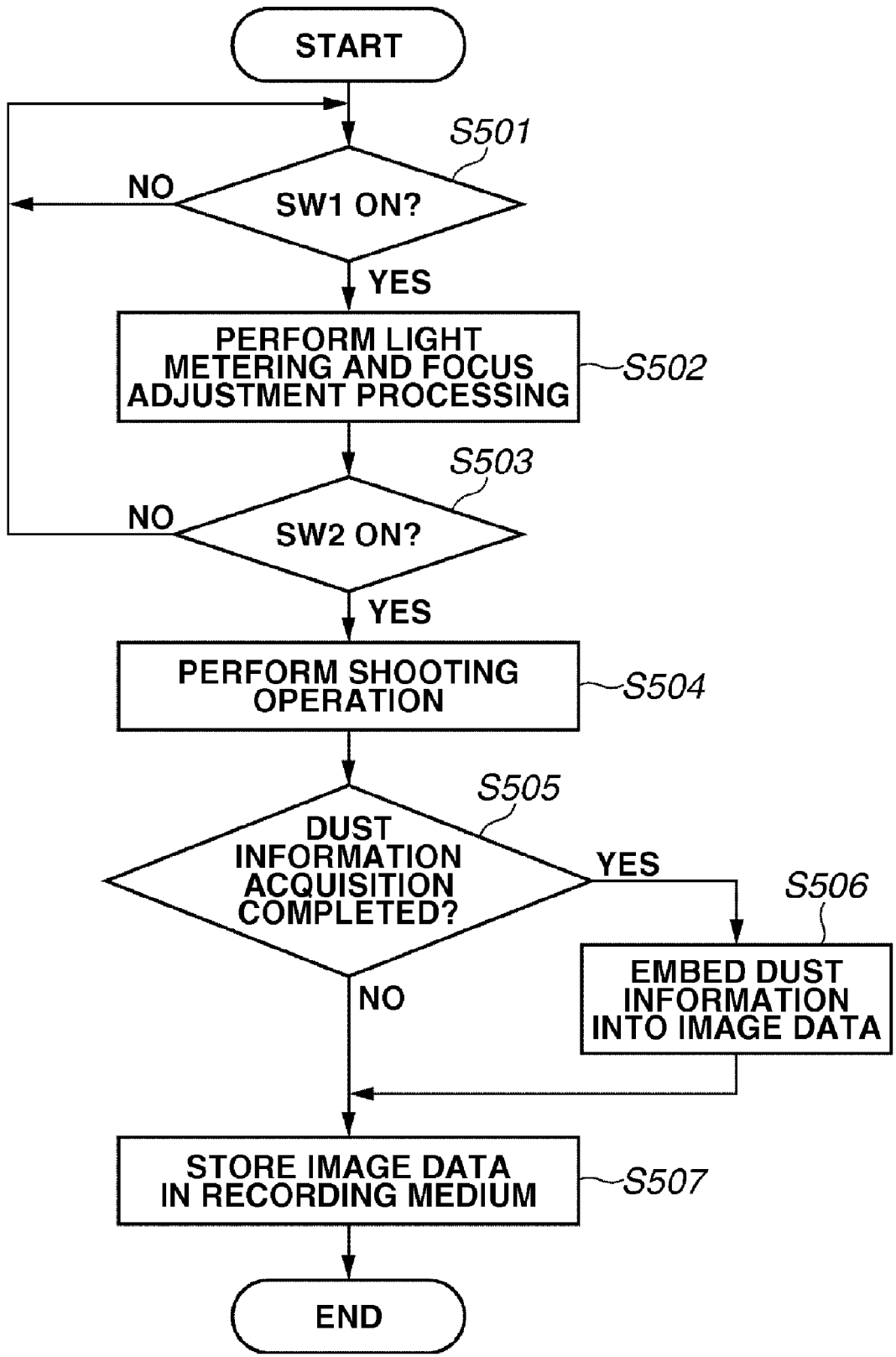
FIG. 6 is a flowchart illustrating an example of still image capturing processing in an ordinary shooting operation according to an exemplary embodiment of the present invention.
Figure 7:
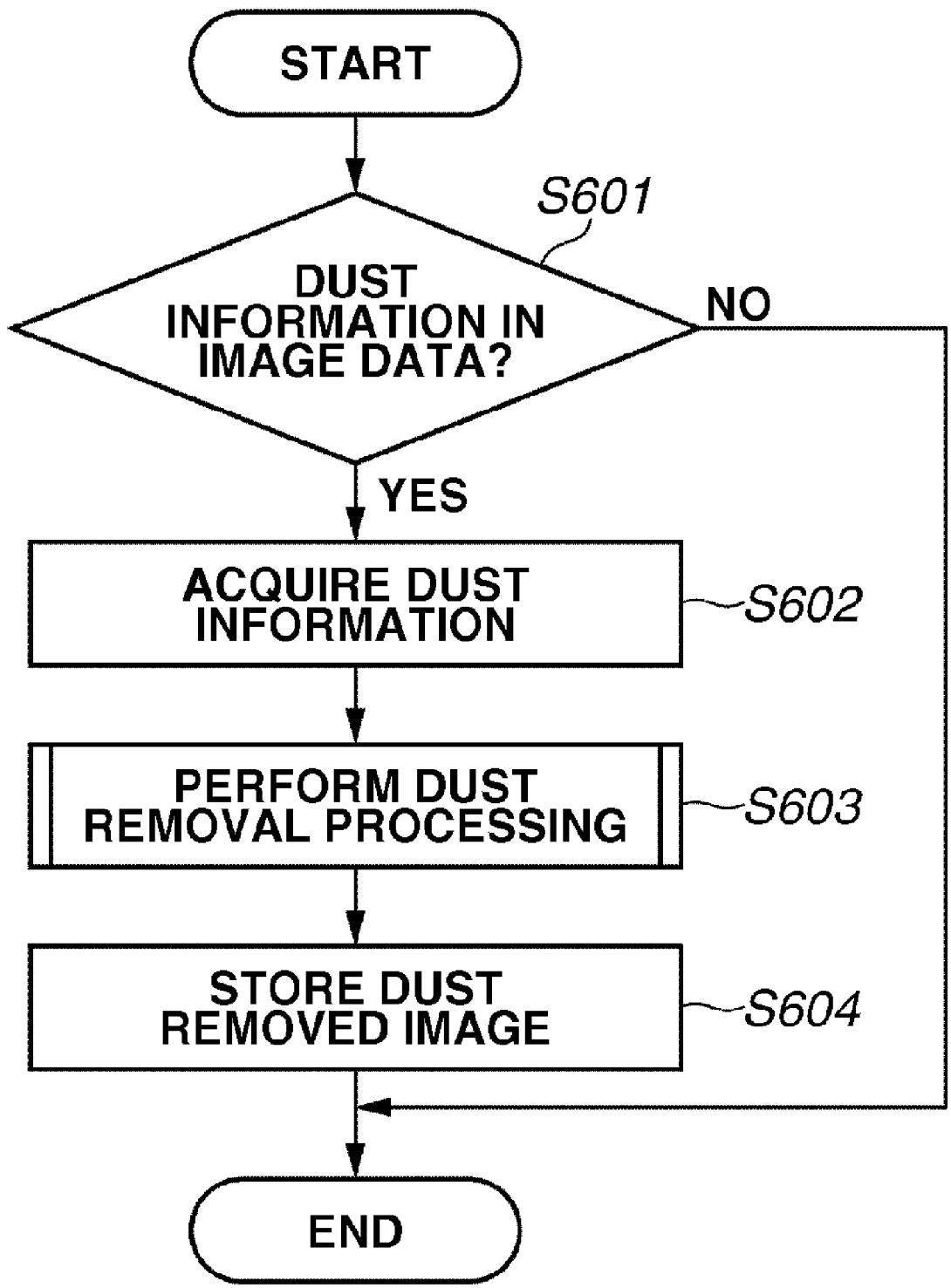
FIG. 7 is a flowchart illustrating an example of dust removal processing.

FIG. 6 is a flowchart illustrating an example of still image capturing processing in an ordinary shooting operation according to the present exemplary embodiment.

In step S501, the imaging apparatus determines whether the shutter switch SW1 62 is turned on. If it is determined that the shutter switch SW1 62 is in the OFF state (NO in step S501), the imaging apparatus repeats the processing in step S501. If it is determined that the shutter switch SW1 62 is in an ON state (YES in step S501), then in step S502, the imaging apparatus performs light metering and focus adjustment processing.

Next, in step S503, the imaging apparatus determines whether the shutter switch SW2 64 is turned on. If it is determined that the shutter switch SW2 64 is in the OFF state (NO in step S503), the processing returns to step S501 to repeat the above-described processing. If it is determined that the shutter switch SW2 64 is in the ON state (YES in step S503), then in step S504, the imaging apparatus performs a shooting operation.

If the imaging apparatus completes the shooting operation, then in step S505, the imaging apparatus determines whether any effective dust information is present in the nonvolatile memory 56. If it is determined that the dust information is present (YES in step S505), the processing proceeds to step S506. If it is determined that the dust information is absent (NO in step S505), then in step S507, the imaging apparatus stores the captured image data in the recording medium 200.

In the present exemplary embodiment, the imaging apparatus determines whether the dust information is present in the nonvolatile memory 56. However, the imaging apparatus can use any other method to determine whether the shooting operation is performed in the above-described dust information acquisition mode.

For example, it is useful that the imaging apparatus evaluates a flag that is set when the shooting operation is performed in the dust information acquisition mode.

In step S506, the imaging apparatus embeds the acquired dust information in a header area (e.g., Exif area) of the captured image data. In step S507, the imaging apparatus stores the image data including the embedded dust information in the recording medium 200.

An example of the dust removal processing is described below with reference to FIG. 7.

In step S601, the imaging apparatus determines whether the selected image includes embedded dust information. If it is determined that the selected image includes the embedded dust information (YES in step S601), then in step S602, the imaging apparatus acquire the dust information.

In step S603, the imaging apparatus performs correction processing to remove the influence of a dust on image data based on the captured dust information. For example, the imaging apparatus can perform pixel interpolation processing applied to peripheral pixels around a dust.

More specifically, the imaging apparatus obtains a row of coordinate values Di (i=1, 2, ... n), a row of radii Ri (i=1, 2, ..., n), an aperture value f1, and a lens pupil position L1 from the extracted dust correction data. In the present embodiment, Ri represents the size of a dust located on the coordinate Di, which can be preliminarily obtained in a dust correction data sort operation. Further, f1 represents an aperture value of the lens in a dust detection image capturing operation, and L1 represents a pupil position of the lens in the dust detection image capturing operation.

The imaging apparatus further acquires an aperture value f2 and a lens pupil position L2 in an ordinary image capturing operation and converts Di according to the following formula. In the present embodiment, d represents the distance from the image center to the coordinate position Di, and H represents the distance between a surface of the image sensor 14 and the dust. For example, the following formulae can define a converted coordinate Di' and a converted radius Ri'.

$$Di'(x,y) = (L2 \times (L1-H) \times d / ((L2-H) \times L1)) \times Di(x,y)$$

$$Ri' = (Ri \times f1 / f2 + 3) \quad (1)$$

The unit in the above-described formulae is "pixel." In the formula of Ri', "+3" is a margin amount.

The imaging apparatus detects a dust in an area identified by the coordinate Di' and the radius Ri' and, if useful, performs interpolation processing on pixels of the identified area, as described below. The imaging apparatus performs the dust removal processing on all coordinate positions and then the processing to step S604 if the dust removal processing is completed.

In step S604, the imaging apparatus newly records a correction processed image (i.e., the captured image from which the influence of the dust has been removed). Then, the imaging apparatus terminates the dust removal processing.

In the present exemplary embodiment, recording is performed in the camera body 100 by embedding the dust information in the captured image data and, subsequently, dust influence removal correction processing is performed.

Alternatively, the imaging apparatus can perform the dust influence removal correction processing without embedding the dust information when the image is captured and recorded in the camera body 100, and then can record the correction processed image in the recording medium 200.

Figure 8:
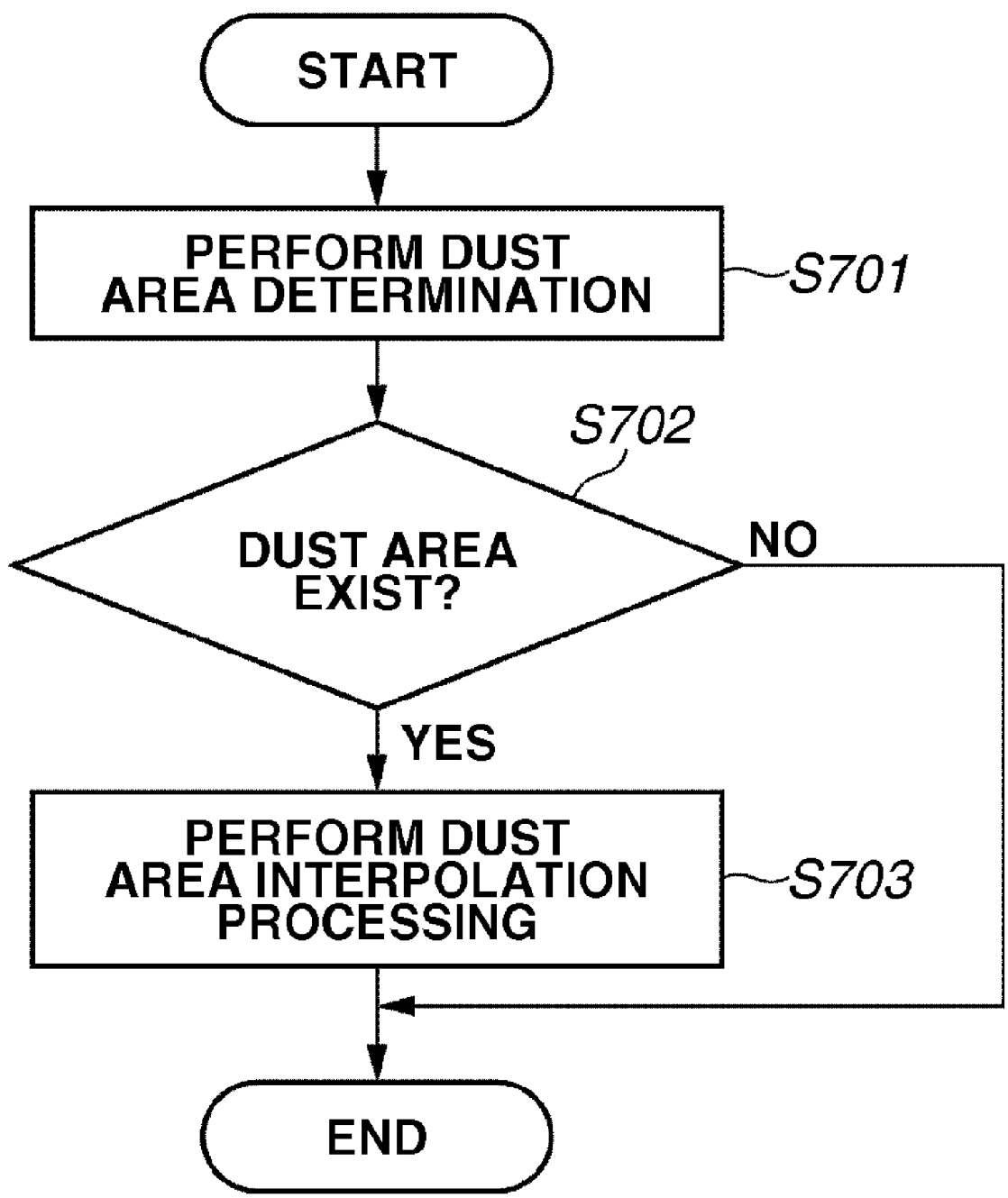
FIG. 8 is a flowchart illustrating an example of an interpolation routine.

An example of dust area interpolation processing is described below in more detail. FIG. 8 is a flowchart illustrating detailed processing in an interpolation routine.

First, in step S701, the imaging apparatus performs a dust area determination. In the present exemplary embodiment, the dust area is an area satisfying all of the following conditions:

(1) An area that is darker than a threshold value T2 defined by the following formula, which is obtained by using an average luminance Yave and a maximum luminance Ymax of pixels included in the center coordinate Di' and the radius Ri' (Di' and Ri' obtained according to the formula (1)).

$$T2 = Yave \times 0.6 + Ymax \times 0.4$$

(2) An area that does not contact a circle defined by the center coordinate Di' and the radius Ri'.
(3) An area having a radius value not less than X1 and not greater than X2, when the radius value is calculated according to the above-described method for an isolated area constituted by low-luminance pixels selected by (1).
(4) An area that includes the center coordinate Di of the circle.

In the present exemplary embodiment, X1 is equal to three pixels and X2 is equal to 30 pixels. Through the above-described screening, the imaging apparatus can process only a small isolated area as a dust area. If the lens pupil position cannot be accurately acquired, the above-described condition (4) can be changed appropriately.

For example, if a target area includes coordinates in the range of ±3 pixels from the coordinate Di in both the X direction and the Y direction, the imaging apparatus determines it as a dust area.

In step S702, the imaging apparatus determines whether an image signal includes the above-described dust area (portion). If it is determined that the image signal includes the dust area (YES in step S702), then in step S703, the imaging apparatus performs dust area interpolation processing. If it is determined that the image signal does not include the dust area (NO in step S702), the imaging apparatus terminates the processing of the interpolation routine.

The imaging apparatus can perform the dust area interpolation processing in step S703 according to a conventionally known defective area interpolation method. For example, a pattern replacement discussed in Japanese Patent Application Laid-Open No. 2001-223894 can be used for the defective area interpolation.

According to the method discussed in Japanese Patent Application Laid-Open No. 2001-223894, a defective area is specified using an infrared ray. In the present exemplary embodiment, the imaging apparatus specifies the dust area detected in step S701 as a defective area and interpolates the dust area using the pattern replacement method based on surrounding normal pixels.

If any pixel cannot be interpolated using the pattern replacement method, the imaging apparatus can select a predetermined number of normal pixels from the pattern interpolated image data that are closest to a target pixel to be interpolated and can perform interpolation based on an average color of the selected pixels.

In a case where the dust removal processing is applied to a still image, the above-described processing for attaching dust correction data to image data is useful because it is unnecessary to identify a relationship between dust correction image data and captured image data.

The dust correction data is compact data constituted by position, size, and conversion data (aperture value, lens pupil position, etc.). Therefore, the data size of a captured image does not become so large. The possibility of error detection can be greatly reduced by performing interpolation processing on only an area including pixels designated by the dust correction data.

The imaging apparatus performs the following electronic image stabilization processing for detecting a camera shake and clipping a part of an image obtained by the image sensor to correct the camera shake according to a camera shake amount.

First, a method for detecting a camera shake is described below. For example, a gyroscope (i.e., an angular speed sensor) attached to the camera body 100 can physically detect a vibration of the camera and can output an angular speed signal representing the camera shake.

A high-pass filter for cutting direct-current (DC) removes a DC component from the angular speed signal output from the angular speed sensor to allow only a vibration component to pass. Further, an integrator integrates the vibration component output from the high-pass filter, calculates an average value of the vibration component, and outputs an angular variation signal as an evaluation value that represents the camera shake.

A shake correction unit is described below with reference to FIGS. 9A, 9B, and 9C. In FIG. 9A, an area 260 indicates an entire imaging area of the image sensor 14. An area 261 surrounded by a dotted line is a clipping frame defined in the entire imaging area of the image sensor. An image in the clipping frame is converted into a standard video signal that can be actually output. In this example, a main subject 269 is captured by a photographer.

FIG. 9C illustrates a video displayed using the standard video signal. As illustrated in FIG. 9C, a reproduced main subject 269' is in a display area 265 of a monitor that reproduces the video signal.

To realize the display area 265 of the monitor, the imaging apparatus performs processing for clipping a captured image to output the standard video signal representing the entire imaging area of the image sensor 14 except its peripheral region.

FIG. 9B indicates a change of the image that occurs when the photographer moves the camera in a direction indicated by arrows 262, 262', and 262" (i.e., lower left direction). In this case, the subject 269 shifts in a direction indicated by an arrow 264 (i.e., upper right direction) on the entire imaging area 260 of the image sensor 14.

If the image is clipped using a clipping frame 261' located on the same position as the clipping frame 261 illustrated in FIG. 9A, the imaging apparatus generates a video signal representing the subject shifted by a vector amount corresponding to the arrow 264.

The imaging apparatus can obtain the video illustrated in FIG. 9C by shifting the clipping frame from the above-described frame position 261' to a frame position 261" based on an image shift amount 263 obtained from the shake amount of the imaging apparatus (i.e., a shake correction target value). The present exemplary embodiment realizes an image shake correction based on the above-described principle.

Figure 10:
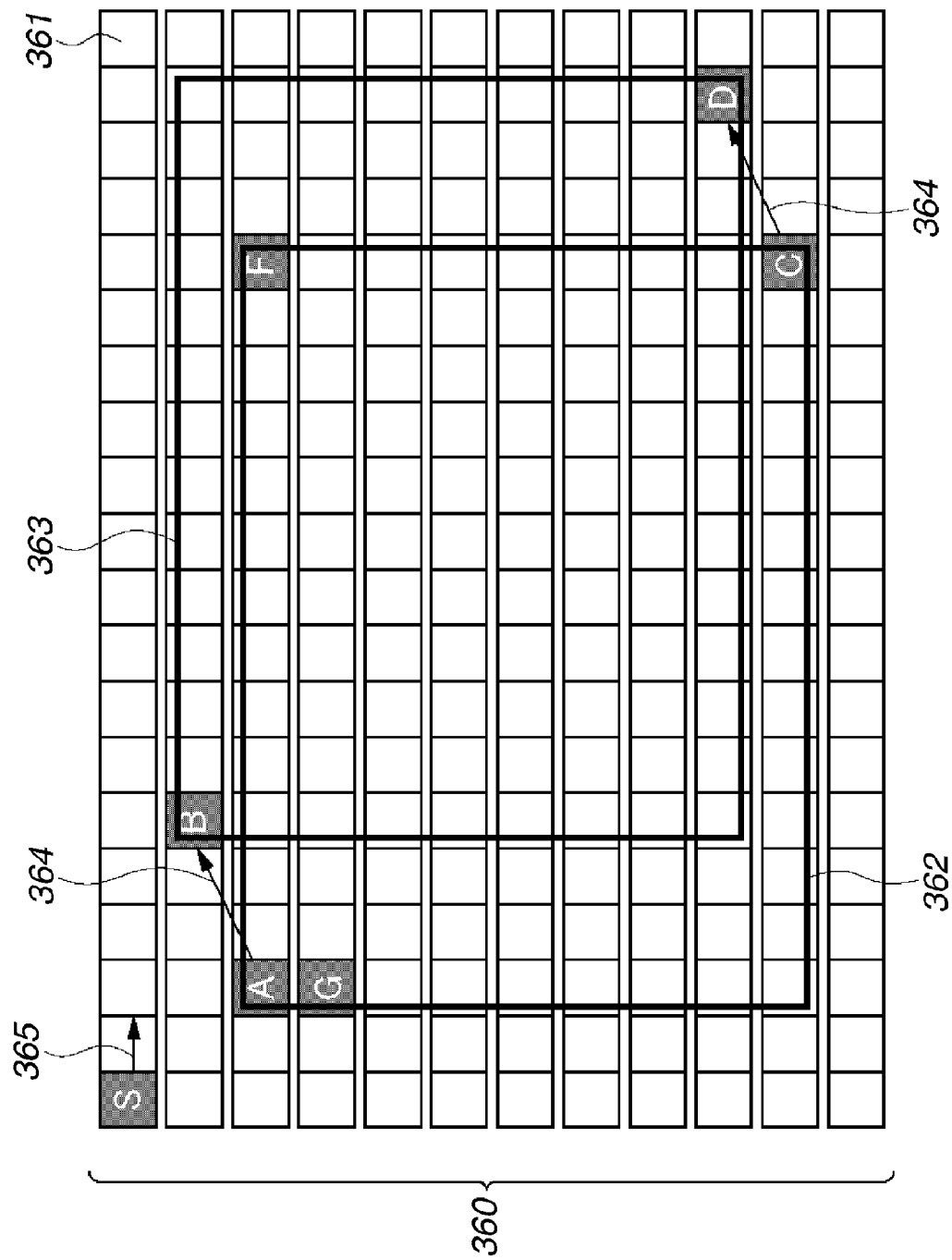
FIG. 10 illustrates an example of storage image clipping processing that can be performed by the shake correction unit.

Imaging area clipping processing that is performed by the imaging apparatus according to the present exemplary embodiment is described below with reference to FIG. 10.

An entire area 360 of the image sensor 14 is constituted by a plurality of pixels (i.e., photoelectric conversion elements) 361. The imaging apparatus controls charge accumulation and reading of each pixel based on an electric driving pulse generated by a timing generator (not illustrated).

Two clipping frames 362 and 363 are similar to the clipping frame 261 illustrated in FIGS. 9A, 9B, and 9C. For example, the imaging apparatus can perform a video signal clipping using the clipping frame 362 illustrated in FIG. 10 in the following manner.

First, the imaging apparatus successively reads a photoelectrically converted charge amount of each pixel from a starting pixel indicated by "S" in a direction indicated by an arrow 365. The imaging apparatus starts the reading processing within a synchronization period of an output video signal, and terminates the reading processing at a pixel position immediately before a pixel "A" before the synchronization period ends. The transfer rate in the above-described reading processing is higher than that in the ordinary reading processing.

In an actual video period (i.e., after the synchronization period ends), the imaging apparatus reads a charge amount of each pixel from the pixel "A" to a pixel "F" at an ordinary reading speed as image information of a one-line video signal.

Further, in a horizontal synchronization period before the next line, the imaging apparatus reads pixels from a pixel following the pixel "F" to a pixel positioned immediately before a pixel "G" at a transfer rate higher than the ordinary reading speed. Then, the imaging apparatus waits for reading of the next video period.

Similar to the above-described reading processing for the pixels from "A" to "F", the imaging apparatus starts reading processing from the pixel "G."

As described above, the imaging apparatus can control reading timing to selectively extract an arbitrary portion (e.g., a central portion) from the entire imaging area of the image sensor and can obtain a video signal representing the extracted portion.

As illustrated in FIGS. 9A, 9B, and 9C, a captured image shifts in a direction corresponding to a movement of the imaging apparatus. A shifting in the clipping position is described below with reference to FIG. 10.

If a shifting of the subject (=a shake of the imaging apparatus) on the image sensor surface is detected and the shifting amount is comparable to an arrow 364, the imaging apparatus relocates the clipping frame from the position 362 to the position 363 to obtain a clipped video that is not influenced by the shifting of the subject.

In this case, to change the clipping position, the imaging apparatus changes the reading start position from "A" to "B" and reading finish position from "c" to "D", and the imaging apparatus selectively extract a partial portion of the image from the entire imaging area 360 of the image sensor in the same manner as in the above-described reading processing starting from the pixel "A."

More specifically, similar to the above-described reading processing using the clipping frame 362, the imaging apparatus successively reads the photoelectrically converted charge amount of each pixel from the starting pixel indicated by "S" in the direction indicated by the arrow 365.

The imaging apparatus starts the reading processing within the synchronization period of the output video signal, and terminates the reading processing at a pixel position immediately before the pixel "B" before the synchronization period ends. The transfer rate in the above-described reading processing is higher than that in the ordinary reading processing. In the actual video period, the imaging apparatus starts reading the charge amount of each pixel from the pixel "B" at an ordinary transfer rate.

As described above, the imaging apparatus preliminarily reads a peripheral portion of the imaging area of the image sensor by an amount corresponding to shake correction information during a synchronization signal period that does not appear in the actual video period. The imaging apparatus selectively reads a part of the image sensor based on the camera shake information and can obtain a video signal not including an adverse influence of the camera shake.

The following is a moving image file format, which is generally referred to as "MP4" and can be used for recording of moving image data in a digital camera or a digital video camera.

The MP4 file format (see ISO/IEC 14496-14; "Information technology—Coding of audio-visual objects—Part 14: MP4 file format"; ISO/IEC; 2003-11-24) is a file format expanded based on a general file format "ISO Base Media File Format" (see ISO/IEC 14496-12; "Information technology—Coding of audio-visual objects—Part 12: ISO base media file format"; ISO/IEC; 2004-01-23), which is standardized by ISO/IEC JTC1/SC29/WG11 (International Organization for Standardization/International Engineering Consortium) to record MPEG or other moving image/audio content data in a file.

The present exemplary embodiment is not limited to the MP4 file format and can be also applied to a similar file format. For example, ISO file format standards, such as "Motion JPEG 2000 file format" (ISO/IEC 15444-3) and "AVC file format" (ISO/IEC 14496-15), have a basic structure similar to the MP4 file format.

Figure 11:
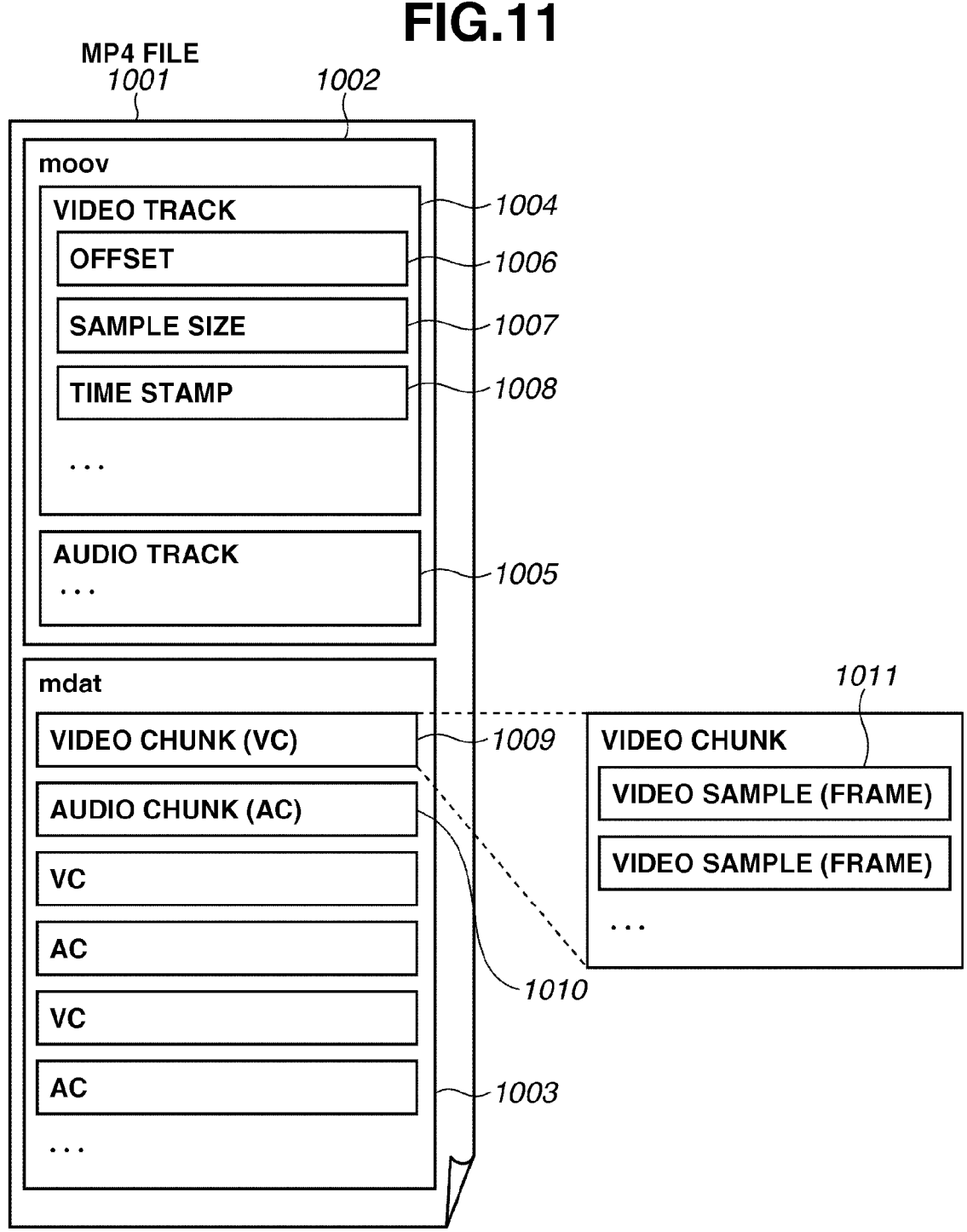
FIG. 11 illustrates examples of meta data and media data according to an MP4 or similar file format.

FIG. 11 illustrates an example of a data structure according to the MP4 file format.

An MP4 file 1001 includes a meta data (i.e., header information) 1002 that indicates physical positions of video/audio data, temporal positions, and characteristics information, and a media data 1003 that indicates actual states of encoded video/audio data.

In the MP4 format, presentation of the entire content is referred to as "movie" and presentation of a media stream constituting the content is referred to as "track." The meta data 1002 includes a video track 1004 that logically handles moving image data and an audio track 1005 that logically handles audio data. The video track 1004 and the audio track 1005 are similar in configuration.

Namely, respective tracks can record various meta data information of actual media data although their contents are variable depending on the characteristics of the media data.

For example, the video track 1004 stores configuration information of a decoder that decodes encoded data and information relating to a rectangular size of a moving image.

In addition, the video track 1004 stores an offset 1006 indicating a file position where the media data is actually recorded, a sample size 1007 indicating the size of each frame data (which may be referred to as "picture") of the media data, and a time stamp 1008 indicating a decoding time of each frame data.

On the other hand, the media data 1003 records substances of the moving image data and the audio data. A data structure of the media data 1003 is generally referred to as a "chunk" that continuously records "samples" indicating a basic unit of encoded data.

The chunk includes, according to the track of the meta data 1002, a video chunk 1009 including moving image media data and an audio chunk 1010 including audio media data.

According to the configuration illustrated in FIG. 11, the video chunk 1009 and the audio chunk 1010 are alternately recorded. However, the recording position and the order of these chunks may be arbitrarily changed.

The illustrated example is an example of a generally recorded format. However, the above-described alternate layout (i.e., interleave) brings an effect of improving accessibility to the data recorded in the file because a moving image and an audio data to be reproduced simultaneously are positioned closely. Therefore, the above-described alternate layout is widely used.

The chunk includes one or more samples of individual media data. For example, as illustrated in FIG. 11, the video chunk 1009 includes a plurality of video samples (i.e., frames) 1011 continuously recorded.

In general, the video sample (i.e., frame) 1011 corresponds to a single frame data (i.e., a picture) of a video. Respective tracks are associated with chunks in the following manner.

For example, if the video track 1004 stores moving image data, information included in the video track 1004 includes information relating to each video chunk 1009 included in the media data 1003.

The offset 1006 is constituted by an information table indicating a relative position of respective video chunks 1009 on the file, so that the position of an actual video chunk can be known by referring to each entry on the table.

The sample size 1007 is written as a size table of a plurality of samples included in respective chunks, i.e., the size of respective frames of a video. More specifically, the video track 1004 stores information indicating the number of samples included in each chunk, so that the samples included in respective video chunks 1009 can be accurately acquired based on the stored information.

The time stamp 1008 is constituted by a table recording a decoding time of respective samples as a difference between samples, so that the time stamp of each sample can be acquired by calculating a cumulative time by referring to this table.

The above-described track and chunk relationship is similarly established between the audio track 1005 and the audio chunk 1010. Accordingly, in both the MP4 file format and the ISO Base Media File Format, encoded data can be acquired from an arbitrary position by a required amount based on the meta data 1002 and the media data 1003 with additional information such as the time stamp.

The present exemplary embodiment does not describe all of standardized recording information because detailed contents of standardized definitions can be known by referring to the corresponding descriptions in ISO/IEC 14496.

Data to be recorded in a file according to the MP4 file format is described in a data structure, which is referred to as a "BOX." The BOX is configured by the following fields:

Size: size of the entire BOX including a size field itself.

Type: 4-byte identifier representing a type of the BOX, which is usually expressed using four alphanumeric characters.

Each BOX may include other fields as options, although not described below.

Data to be recorded in a file is stored in a different type of BOX depending on its type. For example, the media data 1003 is recorded as Media Data BOX that stores encoded data (the content of a type field is 'mdat' and, in the following description, if an identifier indicating a BOX type is used, the identifier expresses the BOX having the indicated type). The meta data 1002 is recorded as Movie BOX ('moov') that stores meta data information of the entire content.

Similarly, the above-described information relating to the chunk and the sample is recorded for each track in the moov as a BOX having a unique identifier.

The MP4 file format allows not only recording all of meta data in the moov but also dividing the meta data into a plurality of areas and sequentially recording the divided data areas. The latter format is referred to as "Fragmented Movie."

Figure 12:
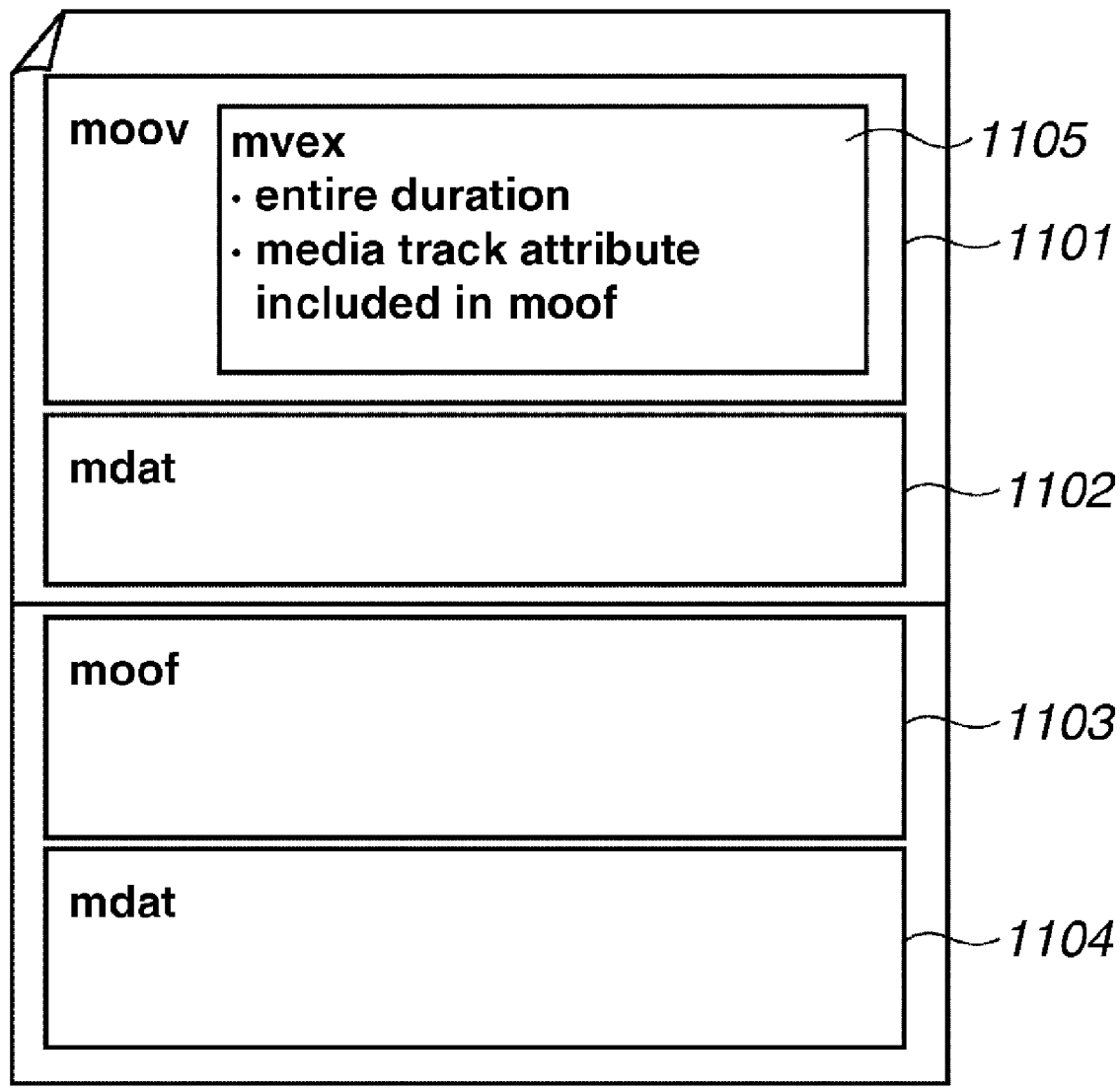
FIG. 12 illustrates an example of a fragmented movie.

FIG. 12 illustrates a file structure according to a fragmented movie format. Contents of the fragmented movie format (such as media data and meta data) can be divided into a plurality of "fragments" at arbitrary units of time and time-sequentially recorded from the head of a file. For example, according to the example illustrated in FIG. 12, moov 1101 indicates meta data in the first fragment and stores information relating to data included in mdat 1102.

Similarly, moof 1103 indicates meta data in the second fragment and stores information relating to data included in mdat 1104. In a case where the fragmented movie format is employed, a Movie Extends Box ('mvex') is added 1105 indicating that a fragment is present in the moov 1101. Information included in the mvex 1105 is, for example, duration (time length) of the entire content including all fragments.

As described above, the file according to the MP4 file format stores various attributes relating to the media data in a meta data area separately from the media data. Therefore, it is easy to access desired sample data regardless of a physical storage state of the media data.

An example of a method for associating the above-described dust correction data with the video sample (frame) 1011 in a moving image recording operation is described below, in which the moving image file format to be used for recording moving image and audio data according to the present exemplary embodiment is the fragmented movie format illustrated in FIG. 12 (i.e., the MP4 file format).

The present exemplary embodiment can be also applied to the above-described standards "Motion JPEG 2000 file format" (ISO/IEC 15444-3) and the "AVC file format" (ISO/IEC 14496-15), as well as any other standards employing a file format and an architecture similar to those regulated by MP4, such as a Third Generation Partnership Project (3GPP) file format, which is a moving image file standard regulated for wireless terminals represented by third generation portable phones (see 3GPP TS 26.244 "Technical Specification Group Services and System Aspects Transparent end-to-end packet switched streaming service (PSS); 3GPP file format (3GP) (Release 6)" 3rd Generation Partnership Project; 2003-02-28).

A file recording operation and dust removal processing that is performed in a moving image capturing operation by the imaging apparatus having the image processing function according to the present exemplary embodiment is described below.

Figure 13:
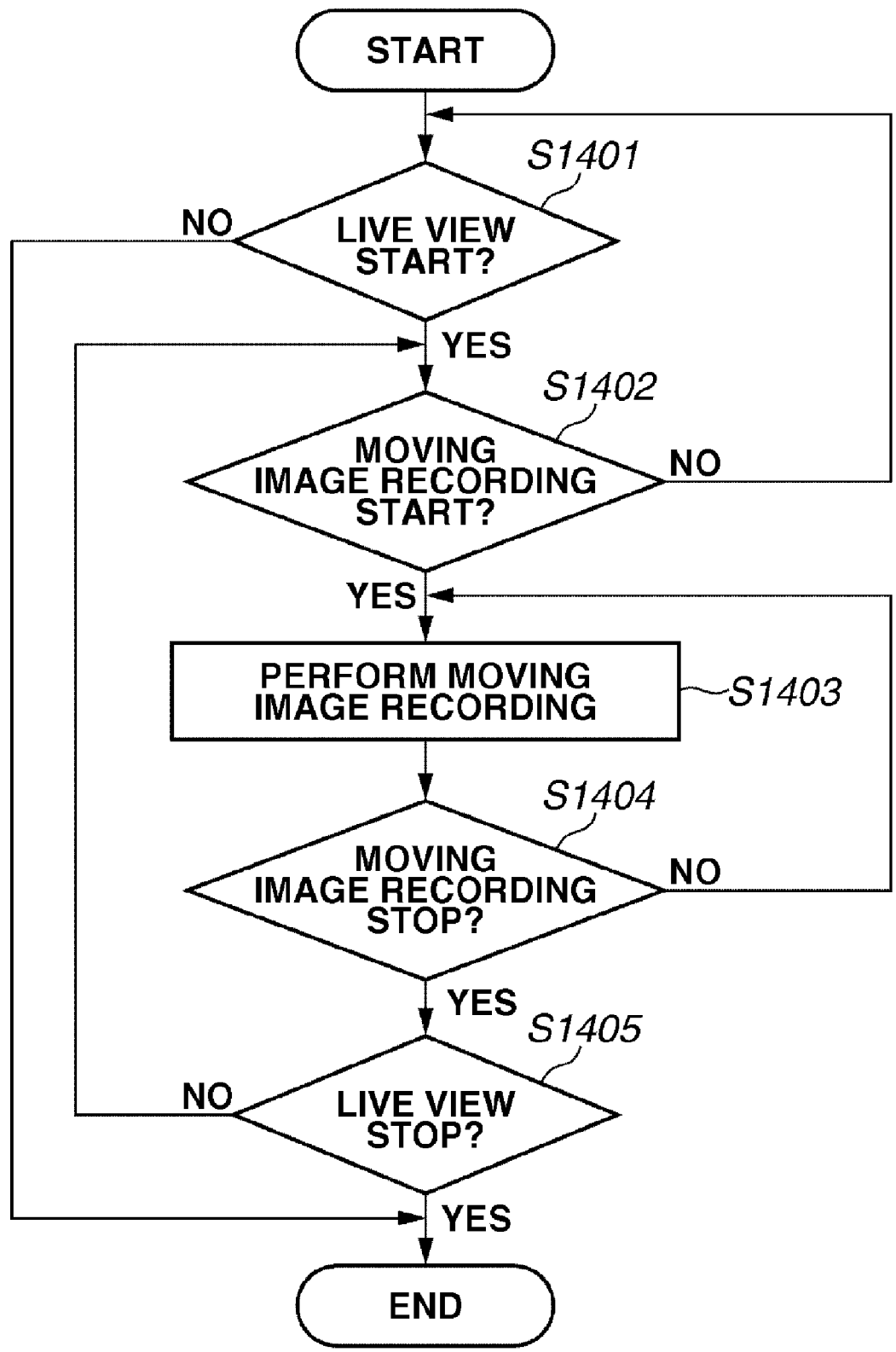
FIG. 13 is a flowchart illustrating an example of moving image capturing processing.

FIG. 13 is a flowchart illustrating an example of the moving image capturing processing.

First, in step S1401, the imaging apparatus determines whether live view start is selected via the operation unit 70. If it is determined that the live view start is not selected (NO in step S1401), the imaging apparatus repeats the determination processing in step S1401.

If it is determined that the live view start is selected (YES in step S1401), the imaging apparatus drives the mirror 130 up to open the shutter 12 so that an optical image is formed on the image sensor 14.

The A/D converter 16 converts an analog signal output from the image sensor 14 into a digital signal at a predetermined frame rate. The image processing circuit 20 performs the predetermined pixel interpolation processing and the color conversion processing, and stores the processed signal in a frame memory buffer of the memory 30.

In this case, the camera body 100 requests the lens unit 300 to transmit various optical information (e.g., aperture, zoom position, pupil position, and focal length) according to the frame rate. The optical information storage memory 58 stores various optical information received from the lens unit 300 via the connector 122 in association with each image data of the frame memory buffer.

The image data stored in the frame memory buffer is read again by the image processing circuit 20 that converts the read image data into display image data (i.e., image data to be used for display). The image display memory 24 stores the display image data.

The image display unit 28 displays the display image data that is received from the image display memory 24 via the D/A converter 26. In this case, the image display unit 28 is in a live view display state. In other words, the image display unit 28 performs an electronic viewfinder operation.

In step S1402, the imaging apparatus determines whether moving image recording start is selected by the operation unit 70. If it is determined that the moving image recording start is not selected (NO in step S1402), then the processing returns to step S1401 and the imaging apparatus repeats the above-described processing. If it is determined that the moving image recording start is selected (YES in step S1402), then in step S1403, the imaging apparatus starts the moving image recording.

When the moving image recording starts, the audio signal processing circuit 33 encodes audio data input from the microphone (not illustrated) and the encoded audio data is temporarily stored in an audio encoded data buffer of the memory 30.

The amount of temporarily stored moving image encoded data and audio encoded data increases with elapsing time. Therefore, the temporarily stored encoded data are converted into a predetermined file format and occasionally written into the recording medium 200 via the interface 90.

In step S1404, the imaging apparatus determines whether moving image recording stop is selected by the operation unit 70. If it is determined that the moving image recording stop is not selected (NO in step S1404), then the processing returns to step S1403 and the imaging apparatus continues the moving image recording. If it is determined that the moving image recording stop is selected (YES in step S1404), then in step S1405, the imaging apparatus determines whether live view stop is selected.

If it is determined that the live view stop is not selected (NO in step S1405), the processing returns to step S1402 and the imaging apparatus waits for the next moving image recording. If it is determined that the live view stop is selected (YES in step S1405), the imaging apparatus terminates the moving image capturing processing routine.

Next, an example of moving image file generation is described below. If a moving image recording button is turned on in a moving image capturing mode, the imaging apparatus starts moving image capturing processing. First, the imaging apparatus generates a new file that includes moon (i.e., meta data BOX) and mdat (i.e., media data BOX) of the initial fragment.

Next, the imaging apparatus generates dust position correction data. The dust position correction data stores lens information of the lens used in the moving image capturing processing, such as aperture value, lens pupil position information, and the dust correction data illustrated in FIG. 5.

The memory 52 stores the generated dust position correction data. The imaging apparatus reads the dust position correction data from the memory 52 and writes the read data in the meta data moon of the present fragment.

Figure 14:
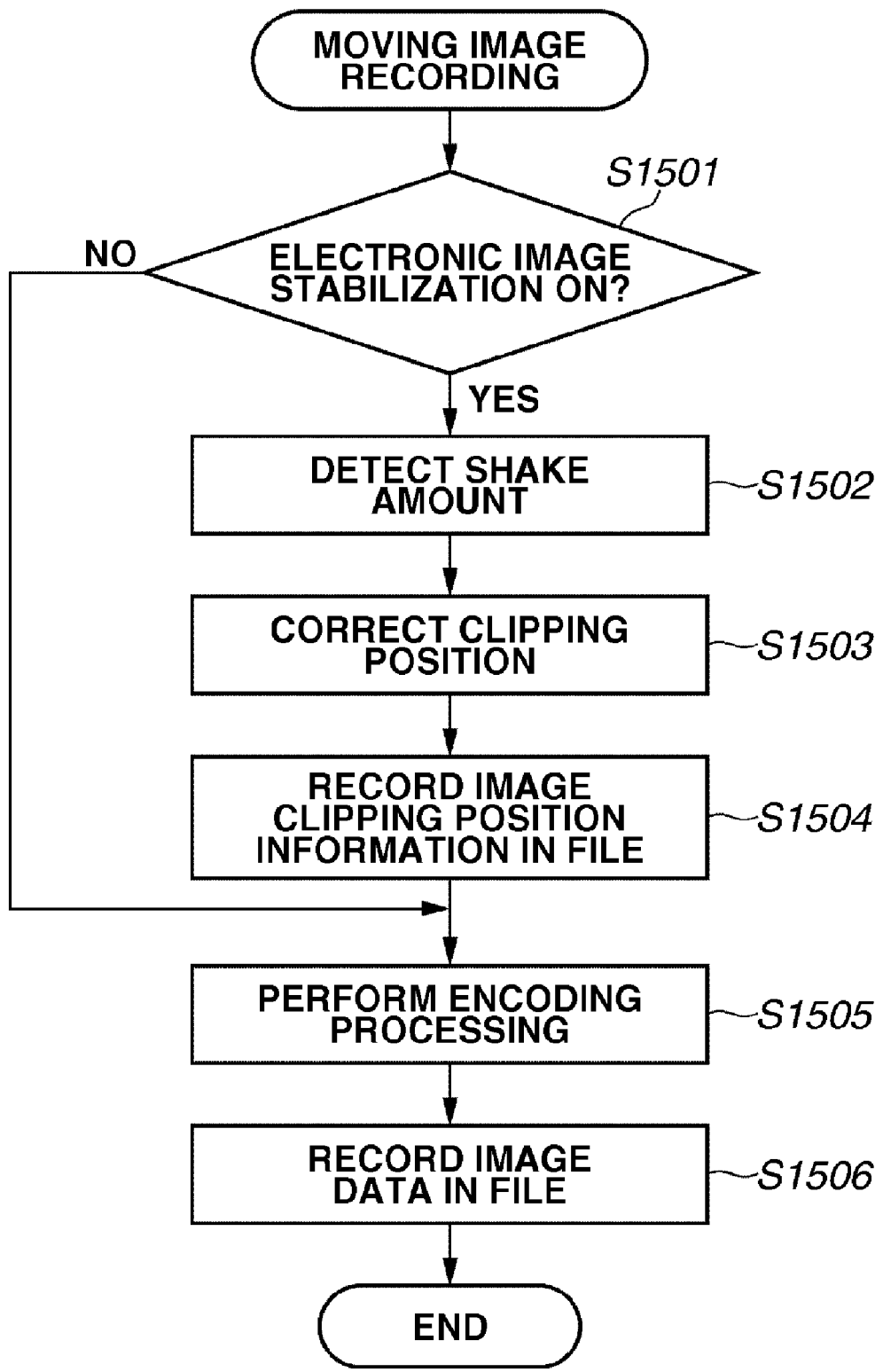
FIG. 14 is a flowchart illustrating an example of a recording routine according to the first exemplary embodiment.

FIG. 14 is a flowchart illustrating an example of recording processing to be performed for each frame in the moving image capturing operation according to the present exemplary embodiment. The system control circuit 50 executes a moving image capturing processing program, which can be loaded from the memory 52, to realize the above-described processing.

First, in step S1501, the imaging apparatus determines whether an electronic image stabilization function was turned on in the moving image capturing operation. If it is determined that the electronic image stabilization function was turned on (YES in step S1501), then in step S1502, the imaging apparatus detects a shake amount based on an output of the angular speed sensor (e.g., a vibration gyroscope).

If it is determined that the electronic image stabilization function was turned off in the moving image capturing operation (NO in step S1501), the processing proceeds to step S1505. As the image clipping position is fixed, the imaging apparatus does not perform recording of the clipping position in a moving image data file.

In step 1503, the imaging apparatus calculates a clipping position correction amount to cancel the shake amount, and corrects a clipping position when an image signal is read by the image sensor 14.

Figure 16:
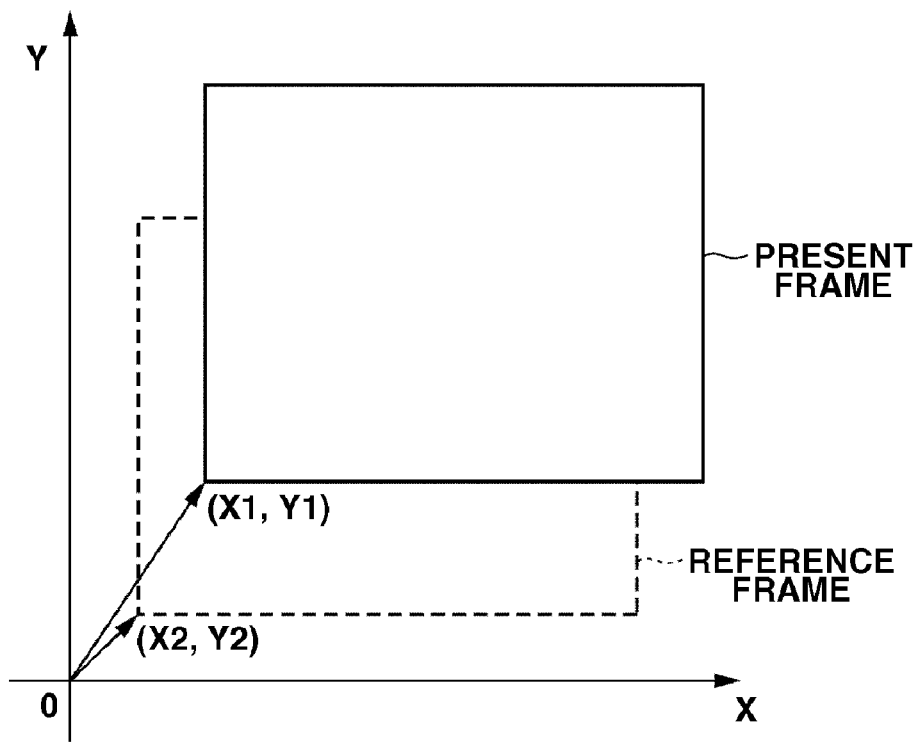
FIG. 16 illustrates an example of image clipping position recording on the entire screen of an image sensor.

In step S1504, the imaging apparatus records corrected image clipping position information in the moving image data file. The clipping position information includes an X coordinate value and a Y coordinate value, which are determined relative to the origin, representing the clipping position on the entire screen of the image sensor 14, as illustrated in FIG. 16.

Figure 17:
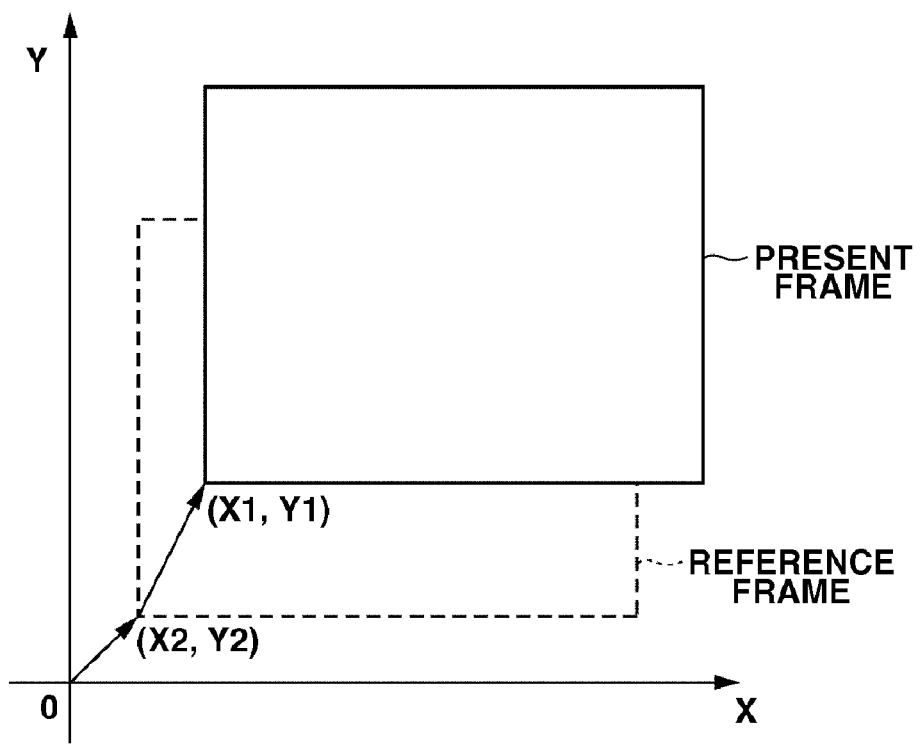
FIG. 17 illustrates an example of image clipping position recording based on a difference amount relative to a reference frame.

Alternatively, the clipping position information may include a deviation (i.e., a difference amount) relative to a reference frame as illustrated in FIG. 17. More specifically, in FIG. 17, the position of the reference frame is determined relative to the origin, and the position of the present frame is determined relative to the position of the reference frame. To perform file recording, the imaging apparatus records the image clipping position information in the meta data moof of the present fragment.

As image data of a plurality of frames can be recorded in one fragment, the imaging apparatus adds a plurality pieces of clipping position information in the meta data moof of one fragment. Therefore, in the writing operation, it is required to associate the frame with the clipping position information.

In step S1505, the imaging apparatus performs image encoding processing to reduce a data amount of the image data. In step S1506, the imaging apparatus records the compressed image data into a file.

Sequential processing in steps S1501 to S1506 is for recording one-frame image. Therefore, the imaging apparatus repetitively performs the above-described sequential processing during the moving image recording operation.

In FIG. 14, the imaging apparatus determines ON/OFF of the electronic image stabilization function for each frame (see step S1501). Alternatively, the imaging apparatus may perform the above-described determination only when it starts the moving image capturing operation and may use the obtained result in the branch processing.

An example of image processing for removing an influence of dust from moving image data captured through an electronic image stabilization system is described below.

The imaging apparatus executes the dust removal processing for each frame using the dust correction data (i.e., dust information) recorded in the recording medium 200 in association with the image data, although the rest of the processing is similar to that for a still image.

The dust correction data is stored in the moon of a moving image file. However, as the number of the dust information is only one, dust information is converted for each frame.

Figure 15:
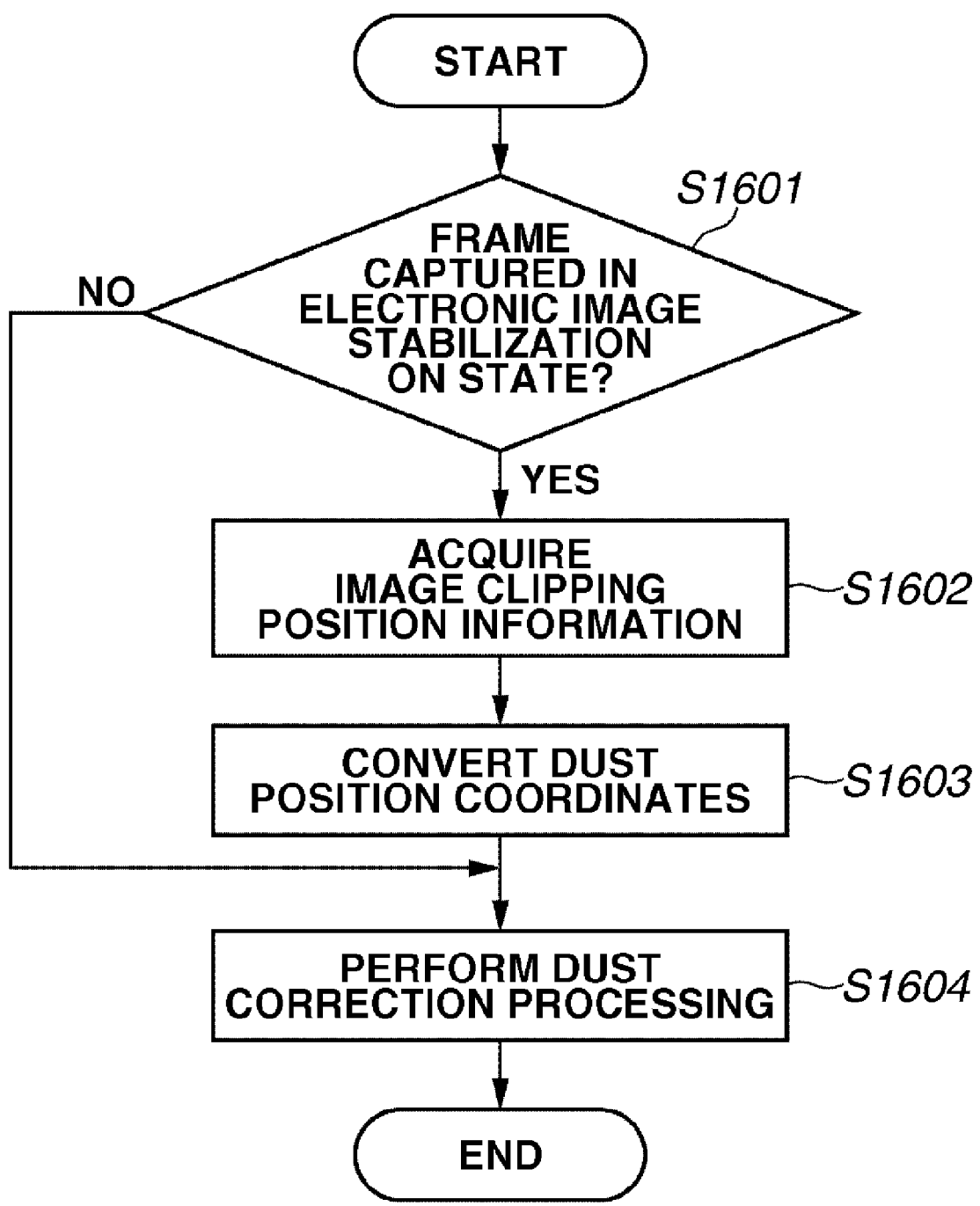
FIG. 15 is a flowchart illustrating an example of a dust removal processing routine.

FIG. 15 is a flowchart illustrating dust removal processing to be performed for each frame according to the present exemplary embodiment.

The camera or a separately provided image processing apparatus may perform the dust removal processing.

In the present exemplary embodiment, in step S1601, the imaging apparatus determines whether a frame of an image to be subjected to the dust removal processing was captured in an electronic image stabilization ON state.

If it is determined that the image was captured in the electronic image stabilization ON state (YES in step S1601), then in step S1602, the imaging apparatus acquires the clipping position information of the frame recorded in the meta data moof.

If it is determined that the image was captured in an electronic image stabilization OFF state (NO in step S1601), the imaging apparatus directly performs dust correction processing.

Figure 18:
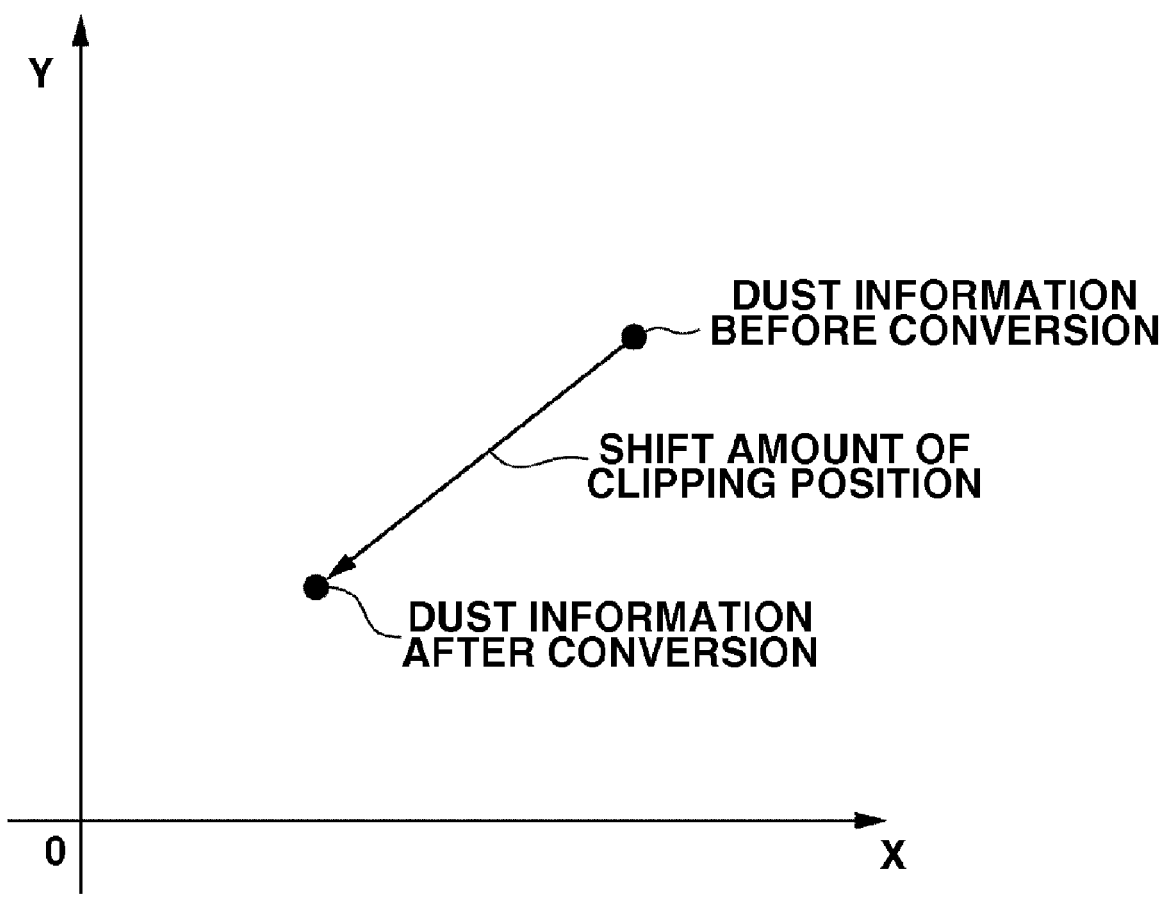
FIG. 18 illustrates an example of dust position coordinate conversion.

In step S1603, as illustrated in FIG. 18, the imaging apparatus converts dust position coordinates to cancel a variation in the clipping position based on the clipping position information acquired in step S1602.

In step S1604, the imaging apparatus performs the dust correction processing using the converted dust position coordinates. The dust correction processing to be performed in step S1604 is the sequential processing illustrated in FIG. 8.

As described above, in the present exemplary embodiment, the imaging apparatus records the image clipping position into a moving image file for each frame when the moving image capturing operation is performed in the electronic image stabilization ON state. Furthermore, when the imaging apparatus performs the dust removal processing, the imaging apparatus converts dust position information based on the clipping position recorded for each frame before performing the dust removal processing.

In this manner, the imaging apparatus can perform the dust removal processing on a moving image when the electronic image stabilization system suppresses a camera shake component of the moving image in the moving image recording operation.

A digital camera according to a second exemplary embodiment is similar to that according to the first exemplary embodiment. Differences in operation between the first exemplary embodiment and the second exemplary embodiment are described below.

The second exemplary embodiment is different from the first exemplary embodiment in that the imaging apparatus performs recording only when a variation in the clipping position exceeds a predetermined threshold (hereinafter, referred to as TH), when the image clipping position information is recorded in a file.

Figure 19:
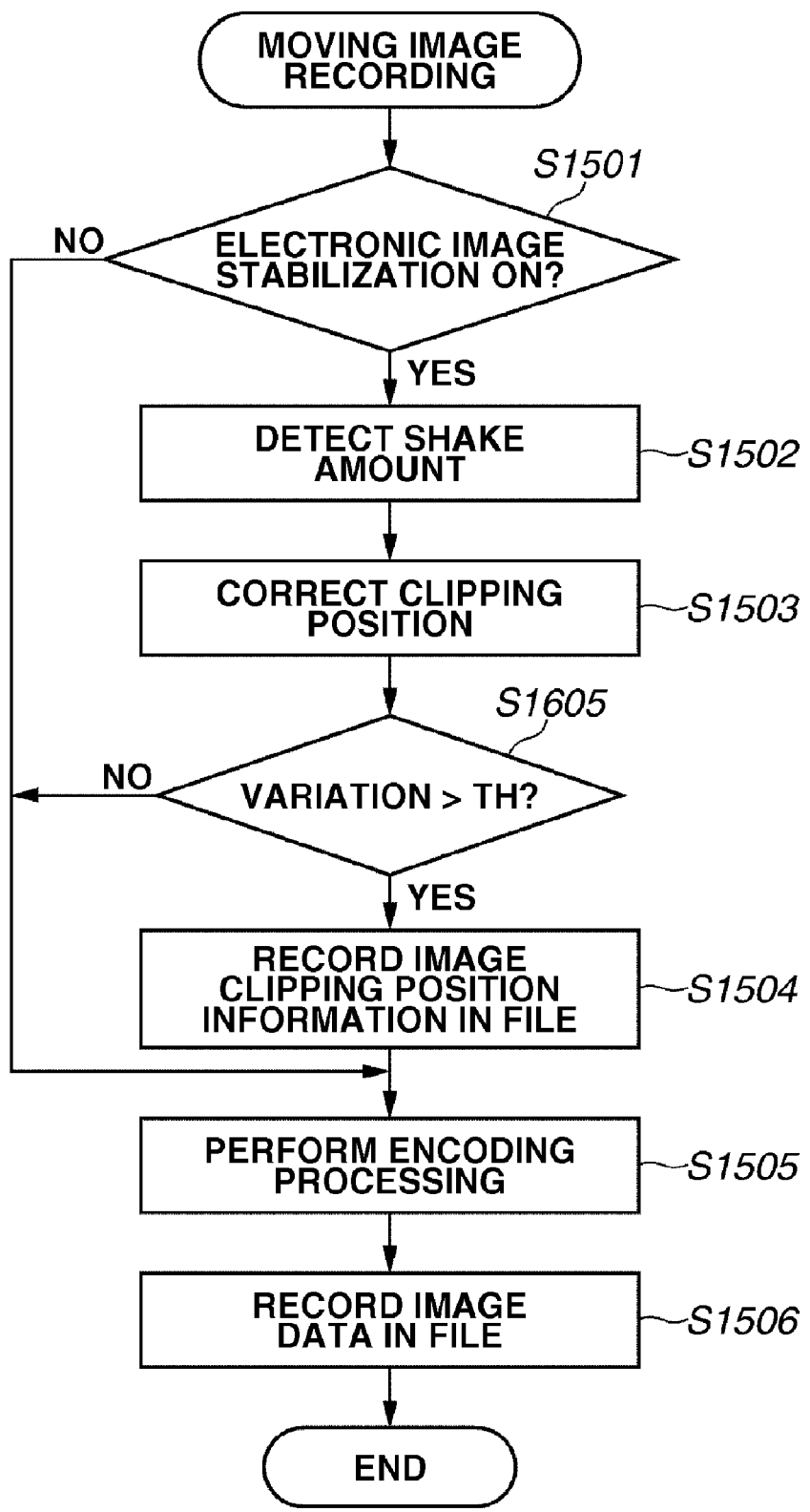
FIG. 19 is a flowchart illustrating an example of a recording routine according to a second exemplary embodiment.

FIG. 19 is a flowchart illustrating an example of recording processing according to the present exemplary embodiment, which is executed for each frame in the moving image capturing operation.

As described in the interpolation routine illustrated in FIG. 8, an area including the circle center coordinate Di can be set to have an appropriate width in the dust area determination. Therefore, if the shift amount of the image clipping position is small, the imaging apparatus can perform the dust removal processing without recording the shift amount.

Therefore, if it is determined that the shift amount in the image clipping position is greater than the threshold TH (YES in step S1605), then in step S1504, the imaging apparatus records the image clipping position information in the moving image file.

If it is determined that the variation in the image clipping position is equal to or less than the threshold TH (equal to or less than a predetermined value) (NO in step S1605), the imaging apparatus does not record the image clipping position information in the moving image file.

However, in a case where the clipping position information is not recorded for all frames, each frame is associated with the clipping position information. Therefore, when the imaging apparatus performs recording of the clipping position information in step S1504, information is also recorded indicating a corresponding frame (e.g., position of the track in the order from the head).

As described above, the present exemplary embodiment can reduce the data amount when the camera shake amount is small and can reduce the processing amount in the conversion of dust position coordinates in the dust removal processing.

The following method can be used to implement the exemplary embodiments. A storage medium storing a software program code for realizing the functions of the above-described exemplary embodiments can be supplied to a system or an apparatus. The program code includes computer executable instructions for implementing the embodiments of the present invention. A computer (or CPU or micro-processing unit (MPU)) in the system or the apparatus can execute the program code stored in the storage medium.

In this case, the program code itself read out of the storage medium and executed by the computer realizes the functions of the above-described exemplary embodiments. The storage medium storing the program code constitutes the present invention. Not only the functions of the above-described exemplary embodiments can be realized by the computer that executes the read program code, but also the present invention can be realized, for example, in the following cases.

An operating system (OS) or other application software running on a computer can execute part or all of actual processing based on instructions of the program code to realize the functions of the above-described exemplary embodiments.

Additionally, the program code read out of a storage medium can be written into a memory of a function expansion card inserted in a computer or into a memory of a function expansion unit connected to the computer. In this case, based on instructions of the program code, a CPU provided on the function expansion card or the function expansion unit can execute part or all of the processing to realize the functions of the above-described exemplary embodiments.

When the present invention is applied to the above-described storage medium, a program code corresponding to the above-described procedure is stored in the storage medium.

A wide variety of storage media may be used to store the program code. The storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-244942 filed Sep. 24, 2008, which is hereby incorporated by reference herein in its entirety.

What is claimed is:

1. An imaging apparatus, comprising:
   an image capturing unit including an image sensor capable of photoelectrically converting a subject image and configured to generate moving image data based on an output signal of the image sensor;
   a first acquisition unit configured to acquire foreign substance information including information relating to at least a position and a size of a foreign substance adhered to an optical element disposed on a front side of the image sensor;
   a detection unit configured to detect a shake amount of the image sensor;
   a control unit configured to control an image clipping position on an entire screen of the image sensor according to the shake amount of the image sensor detected by the detection unit; and
   a recording unit configured to record the foreign substance information and information indicating the image clipping position in association with the moving image data.

2. The imaging apparatus according to claim 1, wherein the information indicating the image clipping position includes an X coordinate and a Y coordinate on the entire screen of the image sensor.

3. The imaging apparatus according to claim 1, wherein the information indicating the image clipping position is a difference relative to an image clipping position of a reference frame.

4. The imaging apparatus according to claim 3, wherein the recording unit does not perform recording of the information indicating the image clipping position in a case where the difference in the image clipping position is equal to or less than predetermined value.

5. The imaging apparatus according to claim 1, further comprising:
   a second acquisition unit configured to acquire the foreign substance information and the information indicating the image clipping position; and
   an interpolation unit configured to convert the foreign substance information based on the information indicating the image clipping position and perform interpolation processing on a pixel corresponding to the foreign substance of the moving image data using the converted foreign substance information.

6. A method for controlling an imaging apparatus including an image capturing unit having an image sensor capable of photoelectrically converting a subject image and configured to generate moving image data based on an output signal of the image sensor, the method comprising:
   storing foreign substance information including information relating to at least a position and a size of a foreign substance adhered to an optical element disposed on a front side of the image sensor;
   detecting a shake amount of the image sensor;
   controlling an image clipping position on an entire screen of the image sensor according to the detected shake amount of the image sensor; and
   recording the foreign substance information and information indicating the image clipping position in association with the moving image data.

7. A program recorded on a non-transitory computer-readable storage medium containing computer-executable instructions for causing a computer to execute a method for controlling an imaging apparatus that includes an image capturing unit having an image sensor capable of photoelectrically converting a subject image and configured to generate moving image data based on an output signal of the image sensor, the method comprising:
   storing foreign substance information including information relating to at least a position and a size of a foreign substance adhered to an optical element disposed on a front side of the image sensor;
   detecting a shake amount of the image sensor;
   controlling an image clipping position on an entire screen of the image sensor according to the detected shake amount of the image sensor; and
   recording the foreign substance information and information indicating the image clipping position in association with the moving image data.

* * * * *